United States Patent
Sonnenberg et al.

(10) Patent No.: US 9,729,562 B2
(45) Date of Patent: Aug. 8, 2017

(54) CROSS-LAYER CORRELATION IN SECURE COGNITIVE NETWORK

(71) Applicant: HARRIS CORPORATION, Melbourne, FL (US)

(72) Inventors: Jerome Sonnenberg, Melbourne, FL (US); Marco Carvalho, Satellite Beach, FL (US); Richard Ford, Satellite Beach, FL (US)

(73) Assignee: Harris Corporation, Melbourne, FL (US)

( * ) Notice: Subject to any disclaimer, the term of this patent is extended or adjusted under 35 U.S.C. 154(b) by 196 days.

(21) Appl. No.: 14/635,064

(22) Filed: Mar. 2, 2015

(65) Prior Publication Data

US 2016/0261615 A1    Sep. 8, 2016

(51) Int. Cl.
*H04L 29/06*     (2006.01)
*H04L 12/707*    (2013.01)
*H04L 29/12*     (2006.01)
*H04L 12/24*     (2006.01)
*H04L 29/08*     (2006.01)

(52) U.S. Cl.
CPC .......... *H04L 63/1416* (2013.01); *H04L 41/12* (2013.01); *H04L 45/22* (2013.01); *H04L 61/2053* (2013.01); *H04L 63/101* (2013.01); *H04L 63/1458* (2013.01); *G06F 2217/08* (2013.01); *H04L 69/321* (2013.01)

(58) Field of Classification Search
USPC ......................................................... 726/23
See application file for complete search history.

(56) References Cited

U.S. PATENT DOCUMENTS

| | | |
|---|---|---|
| 7,295,956 B1 | 11/2007 | Ruetsch |
| 7,664,622 B2 | 2/2010 | Ruetsch |
| 7,742,902 B1 | 6/2010 | Ruetsch |
| 7,975,036 B2 | 7/2011 | Shyy et al. |
| 8,660,499 B2 | 2/2014 | Sagae et al. |
| 8,660,530 B2 | 2/2014 | Sharp et al. |

(Continued)

OTHER PUBLICATIONS

Amanna, Ashwin and Jeffrey H. Reed, "Survey of Cognitive Radio Architectures," IEEE SoutheastCon 2010 (SoutheastCon), Proceedings of the, IEEE, 2010.

(Continued)

*Primary Examiner* — William Goodchild
(74) *Attorney, Agent, or Firm* — Robert J. Sacco; Carol E. Thorstad-Forsyth; Fox Rothschild LLP

(57) ABSTRACT

A communication network is defended using a distributed infrastructure that leverages coordination across disparate abstraction levels. At each node computing device comprising a communication network, a stored event list is used to detect at least one node event which occurs at a machine code level and is known to have the potential to interfere directly with the internal operation of the node computing device. The at least one node event is one which is exclusive of an event within a network communication domain. In response to detecting the at least one node event at one of the plurality of network nodes, an optimal network-level defensive action is automatically selectively determined by the network. The network level defensive action will involve a plurality of network nodes comprising the communication network.

21 Claims, 16 Drawing Sheets

(56) References Cited

U.S. PATENT DOCUMENTS

| | | | |
|---|---|---|---|
| 8,660,642 B2 | 2/2014 | Ferren et al. | |
| 8,661,053 B2 | 2/2014 | Flynn et al. | |
| 8,664,220 B2 | 3/2014 | Clark et al. | |
| 8,665,080 B2 | 3/2014 | Nagamine et al. | |
| 8,665,111 B2 | 3/2014 | Wang et al. | |
| 8,665,345 B2 | 3/2014 | Karn et al. | |
| 8,665,724 B2 | 3/2014 | Stanwood et al. | |
| 8,665,842 B2 | 3/2014 | McCann et al. | |
| 8,666,367 B2 | 3/2014 | Sharp et al. | |
| 8,666,403 B2 | 3/2014 | Yu et al. | |
| 8,666,917 B2 | 3/2014 | Jaros et al. | |
| 8,666,933 B2 | 3/2014 | Pizzorni et al. | |
| 2002/0066024 A1* | 5/2002 | Schmall | G06F 21/563 726/24 |
| 2007/0266134 A1* | 11/2007 | Shyy | H04W 99/00 709/223 |
| 2008/0215512 A1 | 9/2008 | Narzisi et al. | |
| 2009/0300045 A1* | 12/2009 | Chaudhry | G06F 21/552 |
| 2010/0135226 A1 | 6/2010 | Chandramouli et al. | |
| 2011/0208849 A1* | 8/2011 | Barnett | H04L 63/1433 709/223 |
| 2014/0181976 A1* | 6/2014 | Snow | G06F 21/53 726/23 |
| 2014/0214741 A1 | 7/2014 | Chester et al. | |
| 2014/0214743 A1 | 7/2014 | Chester et al. | |

OTHER PUBLICATIONS

Clancy, Charles, et al. "Applicants of Machine Learning to Cognitive Radio Networks," Wireless Communications, IEEE 14.4 (2007): pp. 47-52.

Fette, Bruce A., ed. "Cognitive Radio Technology," Acedemic Press, 2009.

Horn, Jeffrey, et al., "Multiobjective Optimization Using the Niched Pareto Genetic Algorithm," IlliGAL report 93005 (1993): pp. 61801-62296.

Mitola, Joseph, "Cognitive Radio Architecture Evolution," Proceedings of the IEEE 97.4 (2009): pp. 626-641.

Mostaghim, Sanaz, and Jurgen Teich, "Covering Pareto-Optimal Fronts by Subswarms in Multi-Objective Particle Swarm Optimization," Evolutionary Computation, 2004, CEC2004, COngress on , vol. 2, IEEE, 2004.

Sonnenberg, Jerome, et al., "Quantifying the Relative Merits of Genetic and Swarm Algorithms for Network Optimization in Cognitive Radio Networks," Military Communications Conference, 2012-MILCOM 2012, IEEE, 2012.

Srivastava, V., et al, "Cross Layer Design: A Survey and the Road Ahead", IEEE Communications Magazine, Dec. 2005, vol. 43, Issue 12.

deOliveira, J.P., et al., "Sharing Software Components Using a Service-Oriented, Distributed and Secure Infrastructure," IEEE Computer Society, 21st International Conference on Advanced Information Networking and Applications Workshops (AINAW'07), 0-7695-2847-3/07, © 2007 IEEE.

Rawat, D.B., et al., "Secure Radio Resource Management in Cloud Computing Based Cognitive Radio Networks," 2012 41st International Conference on Parallel Processing Workshops, 1530-2016/12 © 2012 IEEE.

Guo, J., et al., "Secure Minimum-Energy Multicast Tree Based on Trust Mechanism for Cognitive Radio Networks," Published online Sep. 1, 2011 © Springer Science+Business Media, LLC 2011.

Rottondi, C., et al., "Secure Distributed Data Aggregation in Automatic Metering Infrastructure of Smart Grids," UEEE UCC 2013—Selected Areas in Communications Symposium, 978-1-4673-3122-7/13 © 2013 IEEE.

Tran, T., et al., "Secure and Reliable Communication Infrastructure for a Distributed IT-Federation," J. Loffier and M. Klann (Eds.): Mobile Response, LNCS 5424, pp. 138-147, 2009 © Springer-Verlag Berlin Heidelberg 2009.

Zhang, T., et al., "ReDiSen: Reputation-based Secure Cooperative Sensing in Distributed Cognitive Radio Networks," IEEE ICC 2013—Cognitive Radio and Networks Symposium, 978-1-4673-3122-7/13 © 2013 IEEE.

Parvin, S., et al., "Conjoint Trust Assessment for Secure Communication in Cognitive Radio Networks," Mathematical and Computer Modelling 58 (2013) 1340-1350, 0895-7177 © 2013 published by Elsevier Ltd., doi: 10.1016/j.mcm.2013.01.001.

Ogiela, L., et al., "Cognitive Systems and Bio-Inspired Computing in Homeland Security," Journal of Network and Computer Applications 38 (2014) 34-42, 1084-8045 © 2013 Elsevier Ltd.

Alhakami, W., et al., "A Secure MAC Protocol for Cognitive Radio Networks (SMCRN)," Science and Information Conference 2013, Oct. 7-9, 2013|London, UK.

Foster, I., et al., "A Secure Communications Infrastructure for High-Performance Distributed Computing," 1082-8907/97 © 1997 IEEE.

Rifa-Pous, H., et al., "A Secure and Anonymous Cooperative Sensing Protocol for Cognitive Radio Networks," SiN'11, Nov. 14-19, Sydney, Australia © 2011 ACM 978-1-4503-1020-8/11/11.

Arzuaga, T., et al., "A Distributed IT Architecture for Deploying a Secure Advanced Metering Infrastructure," CIGRE 2012 D2-201.

Lang, W., et al., "The 'Intelligent Container'—A Cognitive Sensor Network for Transport Management," IEEE Sensors Journal, vol. 11, No. 3, Mar. 2011, 1530-437X © 2010 IEEE.

\* cited by examiner

CROSS-LAYER CORRELATION IN SECURE COGNITIVE NETWORK

STATEMENT OF THE TECHNICAL FIELD

The inventive arrangements relate to secure cognitive networks. More particularly, the inventive arrangements concern implementing systems and methods for providing a secure distributed infrastructure in a cognitive network that leverages coordination across disparate abstraction levels.

DESCRIPTION OF THE RELATED ART

Tactical communication systems are very important for mission critical operations both for military and civilian applications. In the last several years, the introduction of software defined radios and the increasing complexity, dynamism, and criticality of tactical communication systems have demanded the development of new and more effective approaches to reliable and timely network management, monitoring, and optimization.

Cognitive network management (CNM) is an approach to distributed network management in which adaptive algorithms are used to abstract network and environmental indicators to define preferred configurations for specific operational contexts. The cognitive aspect of CNM refers to the ability of the system to learn and evolve, incorporating prior events into its own reasoning to improve its performance from experience. Security is an important issue in CNM because the requirements of CNM methods and systems often provide openings for attack vectors that can permit the system to be exploited.

In a computer network, nodes comprising the network will often utilize an Open System Interconnection ("OSI") protocol stack for communications. The OSI stack includes a plurality of protocol stack layers for performing respective communication functions. The protocol stack layers include the following seven layers: (1) a physical layer; (2) a data link layer; (3) a network layer; (4) a transport layer; (5) a session layer; (6) a presentation layer; and (7) an application layer. A security environment associated with such a computer network can react to effects noticed at the higher layers of the communications protocol stack. For example, if a communications node begins to misroute packets, or drop routes/change routes to favor a previously seldom used routing node, this might be a concern to the security software that detects these anomalies. The security software can recognize that a communication anomaly is seriously wasting transmission capacity, and can flag the effect as a distributed denial of service attack. However, the result is that one or more nodes have been compromised, the damage has been done, and isolation of the offending node(s) takes a relatively long time.

SUMMARY OF THE INVENTION

The invention concerns implementing systems and methods for defending a communication network from adversarial attack using a distributed infrastructure that leverages coordination across disparate abstraction levels. At each of a plurality of node computing devices comprising a communication network, a stored event list is used to detect at least one node event. The node event is one which occurs at a machine code level and is known to have the potential to interfere directly with the internal operation of the node computing device. Notably, the at least one node event is one which is exclusive of an event within a network communication domain. In other words, the node event is one which is outside the domain of the network communication stack, hardware elements that are exclusively associated with the network communication stack, and a plurality of machine code elements that handle events exclusively pertaining to the communication stack.

In response to detecting the at least one node event at one of the network nodes, an optimal network-level defensive action is automatically selectively determined. The network level defensive action will involve multiple network nodes comprising the communication network. The defensive action is based on or determined by the at least one detected node event and upon a set of known communication requirements established for the network. The method can further involve automatically selectively implementing a node-level defensive action which affects only the node where the at least one node event has been detected if the at least one node event does not require a network-level defensive action to ensure continued satisfaction of the known communication requirements.

A dynamic model is advantageously maintained at the node computing devices, which model is representative of a pattern of network operation for the communication network. The method can further involve using the dynamic model to compare actual network-level events to a range of expected network-level events. Accordingly, a node-level defensive action which is performed in response to the at least one node event can be selectively modified when the actual network-level events do not correspond to a range of expected network-level events. For example, a range of expected network-level events can be reduced in response to the node event which has been detected, such that the network is made more sensitive to unexpected variations in network performance when the at least one node event is detected.

BRIEF DESCRIPTION OF THE DRAWINGS

Embodiments will be described with reference to the following drawing figures, in which like numerals represent like items throughout the figures, and in which.

DETAILED DESCRIPTION

Figure 1:
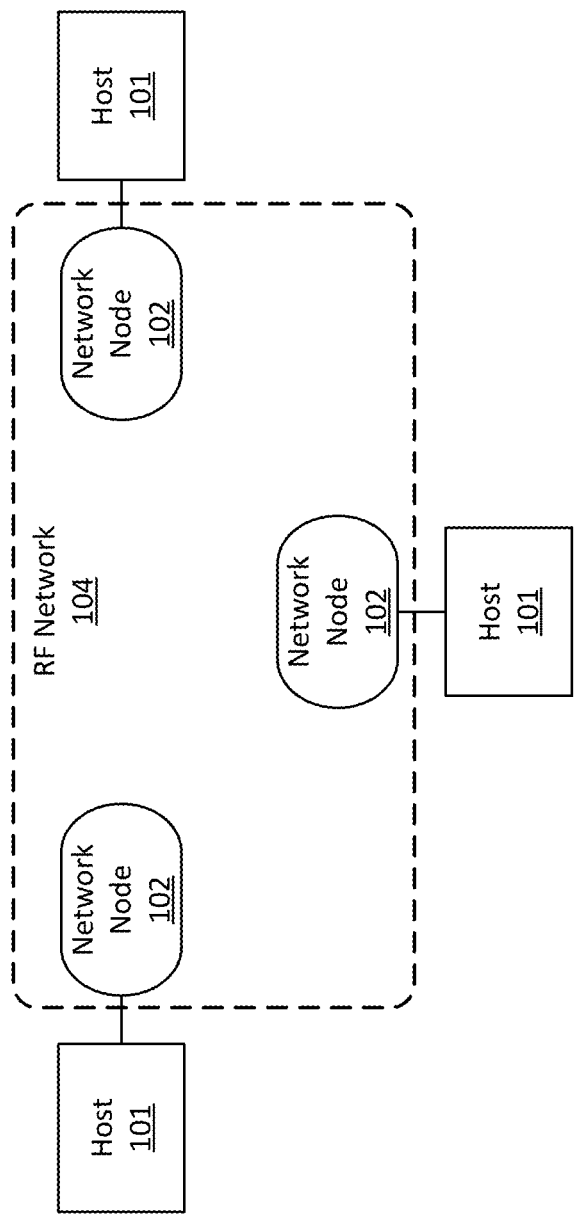
FIG. 1 is a diagram that is useful for understanding an exemplary cognitive network.

The inventive arrangements disclosed herein generally relate to implementing systems and methods for providing a secure distributed infrastructure for a cognitive network. According to one aspect, cross-layer correlation is provided as between platform-specific events and protocol-related effects to provide a robust, secure infrastructure. The approach described herein utilizes notice of certain events to trigger and tailor more precise responses across OSI layers and across nodes so that network performance is only affected to the extent necessary.

The inventive arrangements include a distributed, a cross-layer coordination algorithm that utilizes multiple layer protocol knowledge to coordinate attack mitigation techniques. These attack mitigation techniques are responsive to attacks ranging from lower layer code injection to upper layer protocol exploits. The coordination algorithm determines if an existing encoded mitigation technique will effectively thwart the attack or isolates the attacked node if it cannot. A secure core is used to host the cognitive network management functions so as to provide nearly un-hackable node-by-node defense. In such an arrangement, secure core informs upper layer defenses of attacks, and the upper layer algorithms inform the secure core of patterns of operation that indicate an attack. Individual nodes are essentially un-hackable, and patterns of attack found in upper layer traffic can be used to invoke existing defense mitigation techniques. Accordingly, the inventive arrangements described herein provide a novel method of automatically identifying attack vectors and determining which mitigation techniques afford mitigation to the new attack.

An important feature of the inventive arrangements is the advantageous cross-layer correlation between platform-specific events and protocol-related effects to provide a robust, secure infrastructure. However, the invention goes beyond such cross-layer correlation to provide a higher degree of security. In particular, the invention combines cross-layer attack correlation with hardware-level, instruction by instruction granularity for purposes of detecting platform specific events indicative of an attack at a local node. The integration of instruction-level traps with the cross-layer algorithms described herein provides an exceptionally secure method for cognitive network management as described herein.

By informing and constraining one another, the higher level and lower level defense capabilities can be used in ways that allow the cognitive network to advantageously adapt, or even anticipate suspicious or malicious events. For example, security events detected by traps in the secure host can be reported to the higher-level coordination algorithms. The node-level defense provided by the secure framework is local to the host, and very fast in response time. Conversely, the higher-level SCNM defenses cover a much wider area, and respond in a much slower time scale, in comparison with the host-based defense.

Security Challenges in Cognitive Network Management

In order to understand the inventive arrangements, it is useful to appreciate the main security challenges associated with cognitive network management (CNM) functions in a distributed network. In FIG. 1 a host computing device 101 is connected to a network node 102 which facilitates physical layer network communications. In the exemplary embodiment shown, the network nodes 102 include software-defined radios which facilitate a wireless network 104. However, the invention is not limited in this regard and other physical layer communication devices are also possible. The network nodes 102 execute the distributed monitoring and network management coordination tasks described herein. While illustrated as different components, the host computing devices 101 and the network nodes 102 can be implemented as separate devices or as part of the same device.

To illustrate the discussion, consider the scenario where the host computing device 101 is running one or more software applications and is directly connected to the network node 102. The software applications executing on the host computing device 101 can perform any function which may require network communications support. For example, in a tactical environment, the software applications running on the host computing device can provide support for voice, video and/or data communications. Other exemplary software applications executing on the host can include software for monitoring troop movements, fire control software applications and so on. Of course, cognitive networks designed for use in non-tactical environments may involve use of different software applications and the software applications listed herein are merely provided as examples.

Figure 2:
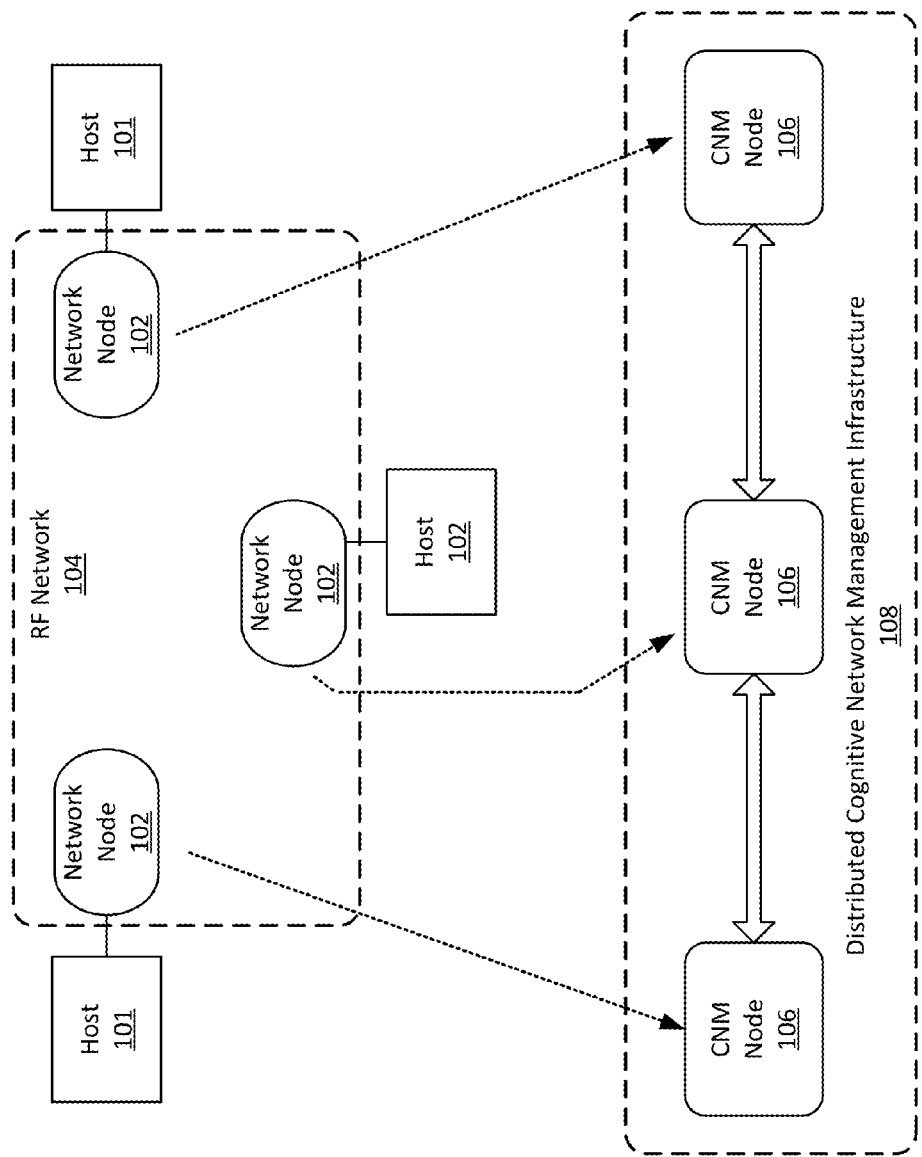
FIG. 2 is a conceptual diagram which is useful for understanding how a plurality of network nodes can comprise components of a distributed cognitive network management infrastructure.

Referring now to FIG. 2, a CNM infrastructure can be represented as a set of abstract CNM nodes 106 that communicate with one another to share information and coordinate actions. This abstract view of the infrastructure also supports the case where the CNM is implemented as part of the network node itself. Accordingly, in FIG. 2, the abstract CNM nodes can represent functionality which is implemented in the host computing device 101, the network node 102, or both. For purposes of the inventive arrangements described herein, it should be understood that the CNM is implemented as part of the network node 102.

From the abstraction illustrated in FIG. 2, it will be understood that there are two main aspects of the infrastructure that could lead to potential vulnerabilities. First, the CNM infrastructure 108 could be attacked at the level of the coordination algorithms as implemented by CNM nodes 106. This class of attacks may include the disruption and modification of the messaging protocols, or the injection of bad/false information in the management framework, (such as invalid resource information, location, and so on). For example, data integrity attacks could be designed to target the coordination algorithm. Protocol attacks could be crafted to listen to communications and anticipate changes in resource allocation. In addition to those attacks which are directed to the actual coordination and higher-level cognitive functions, attacks can also be directed at lower levels in the network. For example, such attacks can be directed against individual nodes (e.g. involve code injection attacks). In this regard it may be noted that the flexibility of an adaptive network at the communications layer is actually a liability for overall security in the event of a low-level compromise. In essence, by allowing the system to adapt, the challenge of modeling and monitoring the system as a whole is increased.

A Secure Distributed Infrastructure for Cognitive Network Management

From the foregoing discussion of network vulnerabilities, it will be understood that there are two main concerns that must be addressed in CNM as outlined above. These include: a) the defense of the network communication protocols and coordination algorithms; and b) the defense of the computational platforms that execute the CNM functions. In order to create a secure cognitive network management (SCNM) infrastructure it is thus necessary to create a defense mechanism which operates at least at the two levels outlined above. Even better, it would be desirable to construct a secure framework that would inform host level defenses of potential protocol or network attacks, and vice versa.

Accordingly, the inventive arrangements for an SCNM infrastructure comprise (1) a set of distributed communication and coordination algorithms to be used by the CNM infrastructure 108 for improved resistance to attacks, (2) secure hardware-based computational platforms which are generally resistant to software attack (3) instruction-level traps integrated into those hardware-based computational platforms to detect attacks which are directed against the computing platform, and (4) coordinated interaction between higher-level defense mechanisms (at the protocol and coordination levels) and low-level defenses (hardware level) defense capabilities. Notably, elements (1), (2) and (3) of the SCNM infrastructure facilitate element (4) by providing secure conditions in which the higher level and lower level defense mechanisms can be implemented. Each of these security features is described below in further detail. The SCNM is advantageously implemented in a distributed manner as illustrated in FIG. 2 by the distributed cognitive network management infrastructure 108.

The Secure Computational Platform

Figure 3:
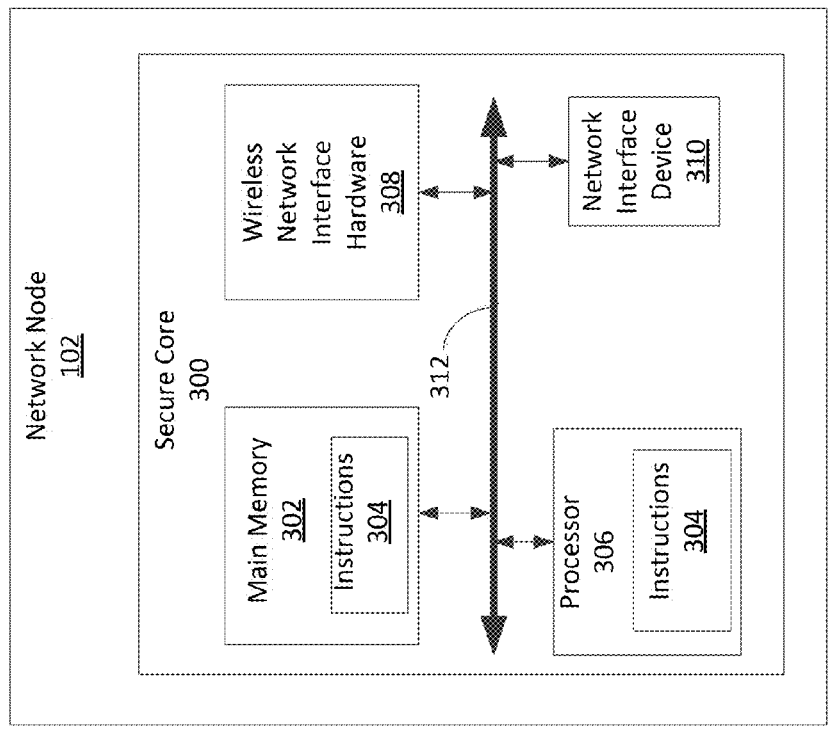
FIG. 3 is a diagram that is useful for understanding an arrangement of certain hardware components included in the network nodes of FIG. 2.

Referring now to FIG. 3, there is shown a more detailed drawing of a network node 102 that is useful for understanding a secure computational platform according to the inventive arrangements. The network node 102 can include more or less components than those shown in FIG. 3. However, the architecture shown in FIG. 3 is sufficient for understanding operations of secure computational platform as described herein.

The network node 102 is comprised of a secure core 300 which includes a processor 306, a main memory 302, a wired network interface device 310, wireless network interface hardware 308, and a data communication bus 312 for communications among the various secure core components. The main memory 302 is comprised of a computer-readable storage medium on which is stored one or more sets of instructions 304 (e.g., firmware) configured to implement one or more of the methodologies, procedures, or functions described herein. The instructions 304 can also reside, completely or at least partially, within the processor 306 during execution thereof by the computer system.

The main memory 302 can also have stored therein hardware resource data, hardware environment data, policy data, and instructions. The hardware resource data includes, but is not limited to, data specifying at least one capability of the network node 102. The hardware environment data includes, but is not limited to, data characterizing a network node environment. The policy data includes, but is not limited to, data specifying current regulatory policies, project policies, and/or mission policies.

All of the various entities comprising the secure core 300 are advantageously implemented in the form of hardware elements which are resistant to software-based attacks. The computer hardware implementation is advantageously comprised of at least one of a non-real-time alterable circuit logic device that is capable of being created with or loaded with logical sequences of operation. An example of such a device that is created with sequential operation logic is an ASIC. An example of such a device that is off-line loaded (non-real time alterable) with sequential operation logic is a FPGA. Accordingly, the various entities comprising the secure core 300 can be advantageously implemented in a field programmable gate array (FPGA), as an application specific integrated circuit (ASIC).

The wireless network interface hardware 308 comprises physical layer communication components for facilitating wireless communications with other nodes of the communication network. According to one aspect, the wireless network interface hardware 308 is designed to be adaptive so as to facilitate implementing a cognitive radio network in which communication protocols can and do change over time as needed in response to changes in a communication environment. As such, the wireless network interface hardware can include radio frequency (RF) hardware components to facilitate implementation of a software defined radio (SDR). The hardware components can also include an analog-to-digital (A/D) converter, digital-to-analog (D/A) converter, and other signal processing components.

The network interface device 310 comprises physical layer communication components for facilitating wired physical layer data communication. For example, the network interface device 310 can facilitate wired communication between the network node 102 and other nodes of a cognitive computer network. The network interface device can also facilitate wired communications with a local host computing device 101 and/or certain user display and control elements as hereinafter described in relation to FIG. 4. The functions and operations of secure core 300 are discussed in further detail below.

Figure 4:
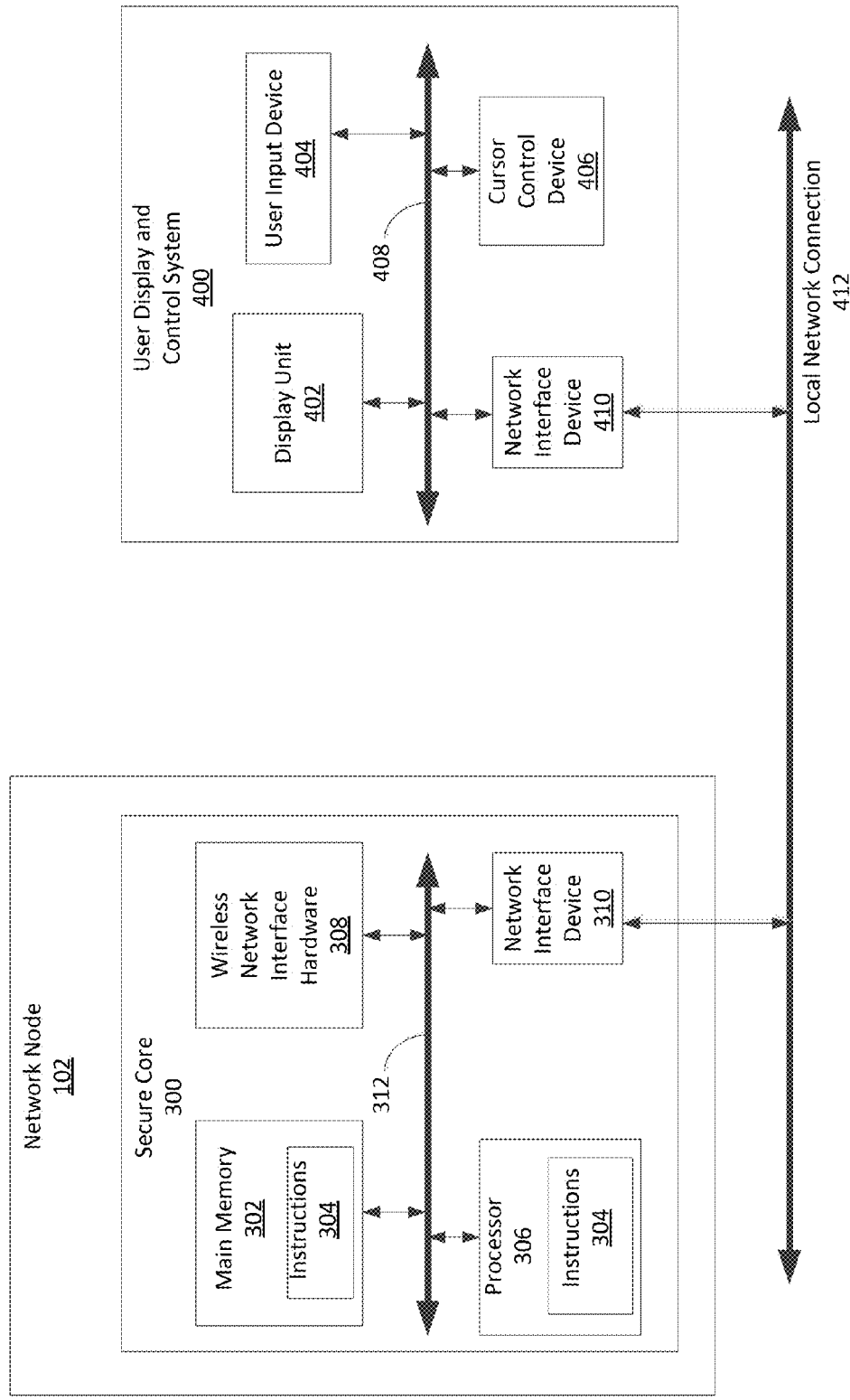
FIG. 4 is a diagram that is useful for understanding a user display and control system that can be used to facilitate user interaction with a network node.

Referring now to FIG. 4, local control over the network node 102 can be facilitated by entities associated with a user display and control system 400. These entities can include a display unit 402 such as a video display (e.g., a liquid crystal display or LCD), a user input device 404 (e.g. a keyboard), and a cursor control device 406 (e.g., a mouse or trackpad) for making selections from displayed elements of a graphical user interface (GUI). The user display and control system 400 also includes a network interface device 410 to facilitate wired local network communications with the secure core of network node 102. A system data bus 408 can be provided to facilitate communications among the various entities comprising the user display and control system 400. In some embodiments, elements of the user display and control system 400 can be provided as part of a host computing device 101; however, the invention is not limited in this regard and these components can be independent of the host computing device 101. A local network connection 412 can be provided to facilitate data communications between the secure core 300 and the user display and control system 400.

Figure 5:
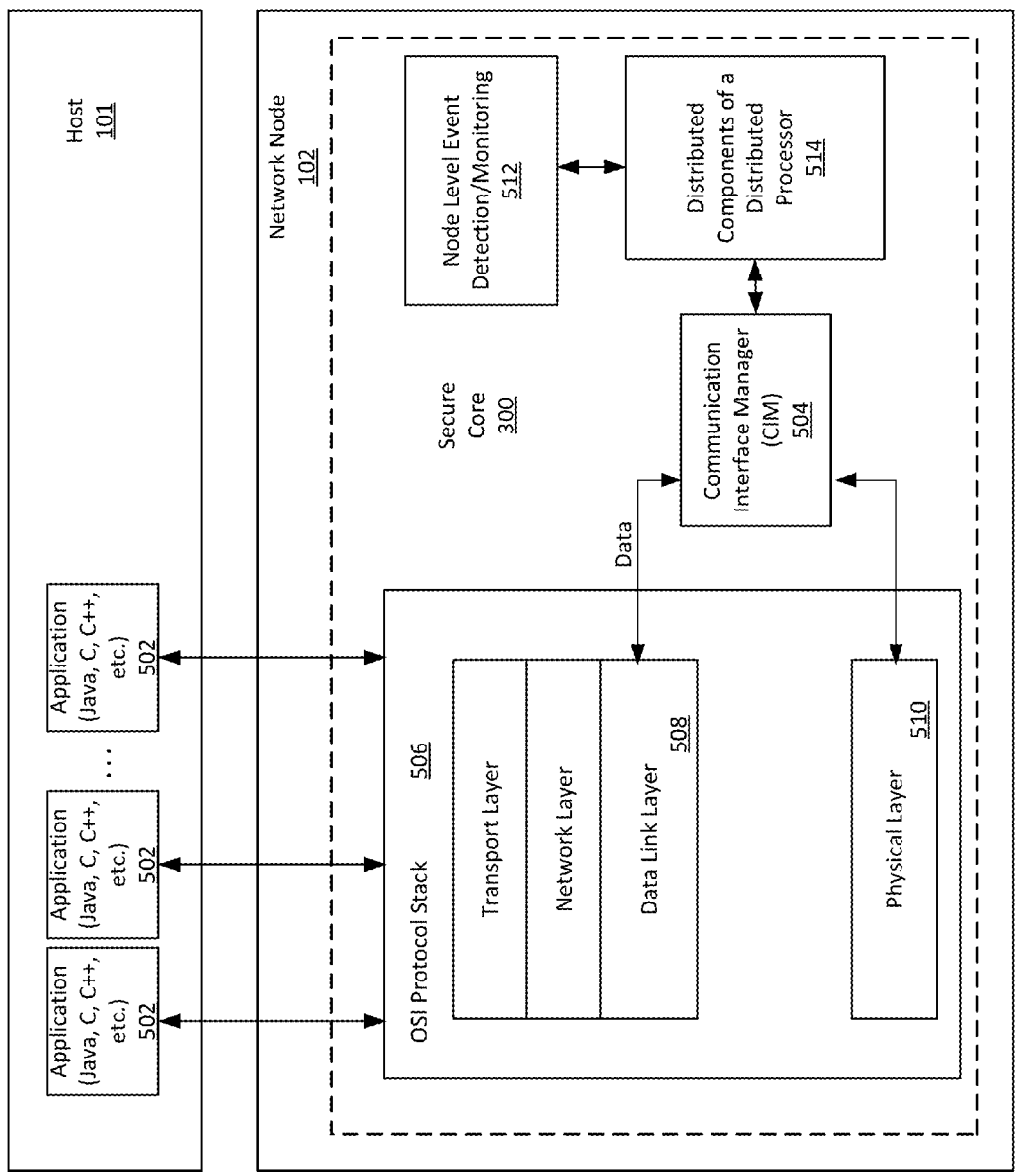
FIG. 5 is a diagram that is a diagram that is useful for understanding certain processing components that are provided in a secure core of a network node.

Referring now to FIG. 5, the secure core 300 hosts a communication interface manager (CIM) 504 (which is integrated with the operations of an OSI protocol stack 506), a node level event detection and monitoring module (NLEDM) 512, and certain distributed components 514 of a distributed processor.

The CIM 504 facilitates implementation of the high-level defensive algorithms which are specified by the distributed components. As such the CIM can facilitate a network response to attack conditions noted by the distributed SCNM infrastructure. These high level defenses will be discussed in more detail below, as the discussion progresses. The NLEDM 512 is comprised of event trapping algorithms which detect low-level attacks directed locally at the node itself. The distributed components of a distributed processor 514 coordinate the operation of node 102 with other nodes 102 comprising the communication network. Such coordination can include evaluation of network threats and selection of high-level defensive algorithms for responding to such threats. Each of these components will now be discussed in greater detail.

As shown in FIG. 5, the operation of the CIM 504 is integrated with an OSI protocol stack 506. The OSI protocol stack facilitates network communications for one or more software applications 502 residing on host computing device 101. These communications can involve voice, video or data communications with applications hosted on other network nodes 102 in the communication network 104. CIM 504 processes or manages data communications at a level between the data link layer 508 and the physical layer 510 of the OSI stack. The physical layer 510 in FIG. 5 can include physical layer devices which facilitate network communications. An example of such a physical layer device would include wireless network interface hardware 308 and/or wired network interface device 310. The CIM essentially abstracts all the communication interfaces for applications in each host computing device 101 to manage and control the exchange of information with the communication network 104. As such the CIM provides a set of communication abstracts for link management and resource control, as well as low level interfaces for frame control and topology management.

Figure 6:
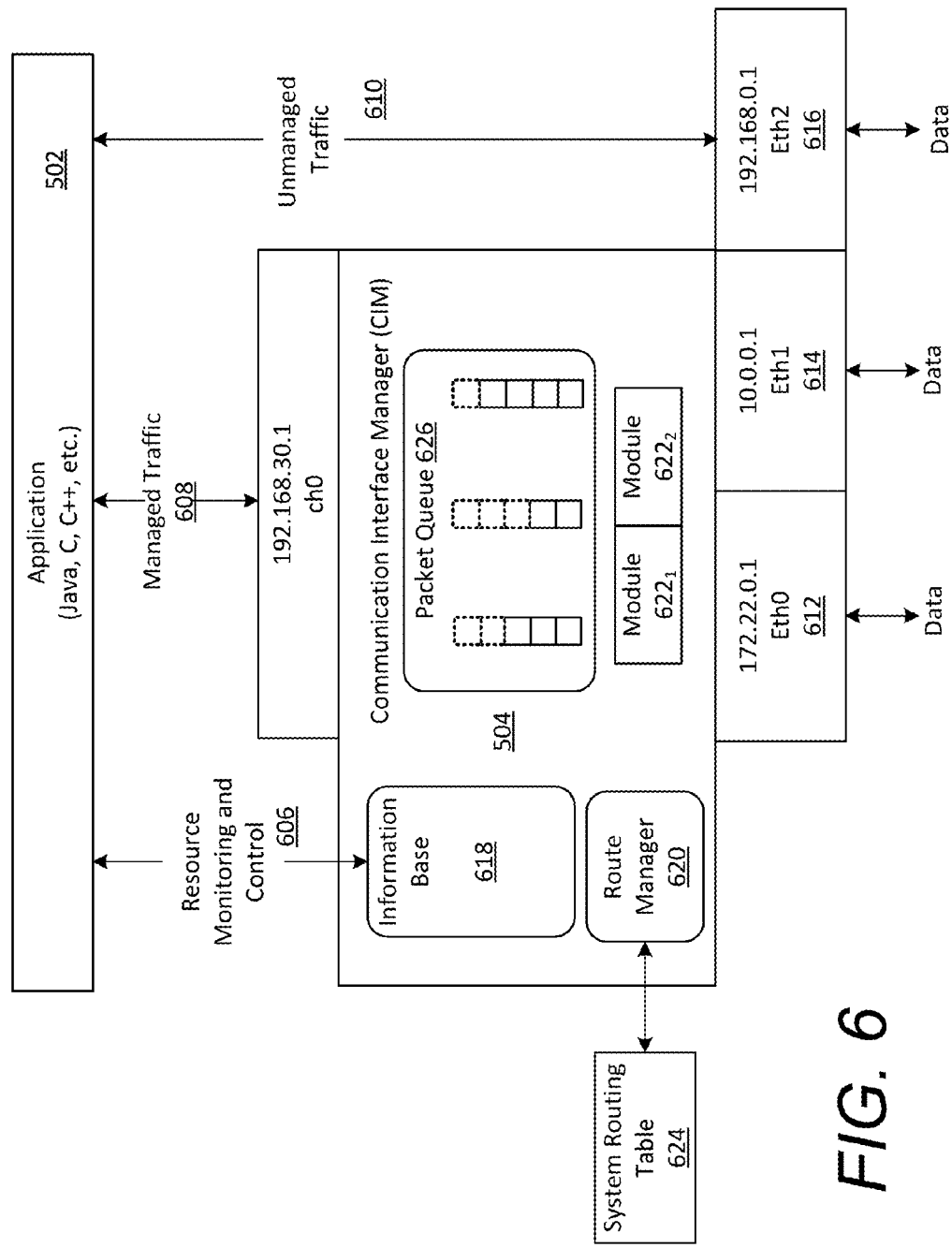
FIG. 6 is a diagram that is useful for understanding the operations of a communication interface manager.

FIG. 6 is a more detailed drawing of the CIM which is useful for understanding the invention. In FIG. 6, the various protocol layers of the OSI stack shown in FIG. 5 are omitted to facilitate an understanding of the operation of the CIM. Also, in FIG. 6, only a single application 502 is shown in communication with the CIM although it should be understood that the CIM can support communications for several applications 502 as shown in FIG. 5. The CIM communicates data traffic to and from one or more application 502. The CIM can be configured to pass certain types of data traffic (e.g., unmanaged traffic 610) directly to a particular logical address 612, 614, 616 associated with a physical layer device 616. For example, unmanaged traffic 610 can include data which constitutes communications between an application 502 and a user display and control system 400 as shown in FIG. 4. Other types of data (e.g., managed traffic 608) are managed in the CIM to facilitate the defensive high level algorithms described herein.

In the CIM, the information base 618 contains correlated event data which comprises observed patterns of behavior of the network of nodes from the local node's viewpoint. The route manager 620 determines which of several communications devices or modules to utilize. In this example, modules $622_1$, $622_2$ are shown as being implemented in the node. However, more or fewer communication modules are possible. The system routing table 624 contains the set of reachable distant nodes for use by the route manager. The packet queue 626 contains packets of managed traffic placed for transmission on a wired or wireless medium. The resource monitoring and control function facilitates regulation the packets of traffic to the CIM from the application 502.

Referring once again to FIG. 5, events detected by the NLEDM 512 are reported to distributed components of the distributed processor 514. Such reporting facilitates determinations by the distributed SCNM infrastructure regarding when certain high-level defense algorithm should be implemented in response to low-level threats detected by the NLEDM. This information about low-level node attacks can also be used locally at node 102 to determine a local defensive action that is appropriate for responding to an attack occurring at such network node 102. A determination concerning such a localized response can be made by the distributed components 514 and/or by other processing elements (not shown) hosted by the secure core.

The NLEDM 512 is comprised of machine or instruction level event trapping algorithms that detect low-level attacks intended to directly disrupt the operations of the network node 102. As such, the event trapping algorithms described herein will advantageously be designed to detect low-level attacks (including code injection attacks) which interrupt or interfere with the machine code or machine language instructions which execute on processor 306. For example, the types of events which are detected can include without limitation attempts to execute instructions stored in memory space which has been designated only for data, attempts to return from a subroutine on an incorrect or unauthorized memory address, and use of invalid opcodes. Other types of machine or instruction level events indicative of an attack can also be detected.

Identification of the types of low-level attack events described herein can be facilitated by use of several security techniques. For example, the secure core can be implemented using a modified Harvard Architecture, in which memory is tagged as either code or data. Such an implementation prevents mixing of the two types of information. Dual stacks can be used to separate control flow and data. One stack can only be accessed by RET and CALL instructions, and cannot be modified directly. The second stack supports the instructions one would normally expect for a stack, including PUSH and POP. Instruction set randomization can be employed to randomize the binary representation of the machine's native instruction set each time the machine is initialized. Such actions ensure that the opcodes necessary for the machine to execute data will not be known to an attacker. When there is an event which attempts to violate one of the foregoing security protocols, such event will be detected by the algorithms associated with NLEDM 512. Other events can also be detected and the invention is not intended to be limited to the specific types of attack events described herein.

Events detected by NLEDM 512 are reported to the distributed components of the distributed processor 514. In some scenarios, the distributed components of the distributed processor 514 may determine that the current operating conditions of the network, or the node in which the event has been detected, do not warrant any response to the detected event or events. Alternatively, the distributed components 514 at a node 102 can respond to the occurrence of one event or a combination of events by performing certain defensive actions exclusively at a local level, and without notifying other nodes of the network.

In still other scenarios, the occurrence of a detected event or combination of events is evaluated by the distributed components of the distributed processor to determine possible high-level network defensive responses to the low-level attack. In such cases, the occurrence of the detected events can optionally be communicated to other network nodes 102. The distributed processor in that case will determine if and when a high-level defensive response is needed by the network. The analysis of such events by the distributed processor is discussed below in further detail in relation to FIGS. 7-11.

Further, based on the security risk which has been determined by the distributed processor, a security level applied at each of the plurality of network nodes can be adjusted to selectively control a sensitivity at each network node to subsequent low-level host attacks. Such adjustments can vary the kinds of events that are reported by the NLEDM, the conditions under which network nodes perform localized defensive actions in response to reported events, and/or conditions under which detected events are reported to other nodes in the network.

The distributed components of a distributed processor 514 facilitate the coordination of network actions as between the various nodes comprising the communication network. In order to understand the function and operation of the distributed components 514, it is useful to first discuss certain features of a distributed SCNM infrastructure according to the inventive arrangements.

In mobile ad hoc tactical military networks or emergency service first responder networks, it is not desirable to have all of the cognitive network intelligence implemented by a single network node (e.g., a base station) because a disabling or removal of that network node would result in a failure of the entire cognitive network. Accordingly, the present invention provides a cognitive network with distributed intelligence, i.e., the intelligence is implemented by a plurality of network nodes, rather than by a single network node.

Accordingly, a cognitive network 104 in accordance with the inventive arrangements will advantageously comprises the following features:
(1) distributed iterative spectrum sensing to facilitate operation in a diverse and changing electromagnetic environment;
(2) low rate and local command/control/rendezvous data transfer among the nodes for robust operation in harsh environments;
(3) distributed intelligence to optimize a distribution of a computational load across network nodes based on available resources and locally imposed active algorithm requirements; and
(4) cross-layer and cross-node optimization of a protocol stack to enable the network to meet dynamic project requirements or mission requirements.

Basing the cross-layer inter-node optimization of an Open System Interconnection ("OSI") protocol stack on Particle Swarm Optimization (PSO) in general and on biologically inspired PSOs employing Swarm Intelligence ("SI") specifically facilitates the implementation of the above listed features (1)-(4).

PSO is generally an multi-objective optimization ("MOO") Artificial Intelligence ("AI") based technique to finding a solution to a problem. As such, a PSO is also referred to in the art as a Multi-Objective PSO ("MOPSO"). An MOPSO technique generally involves: obtaining a population of candidate solutions ("particles"); and moving each particle in a search space with a velocity according to its own previous best solution and its group's best solution. A particle's position may be updated in accordance with the following mathematical equations (1) and (2).

$$\Delta x_{id} = \Delta x_{id} + c_1 \text{rand1}()(p_{id} - x_{id}) + c_2 \text{rand2}()(P_{gd} - x_{id}) \quad (1)$$

$$x_{id} = x_{id} + \Delta x_{id} \quad (2)$$

where $x_{id}$ represents a position of a particle. $\Delta x_{id}$ represents a position change of the particle. $c_1$ and $c_2$ are positive constants. rand1 and rand2 are random number between 0 and 1. $p_{id}$ represents a previous best solution for the particle. $P_{gd}$ represents the previous best solution for the group.

A biologically inspired PSO employs SI. SI is generally the collective behavior of decentralized, self-organized system made up of a population of simple simulation agents interacting locally with one another and with their environment. The simulation agents follow very simple rules. Although there is no centralized control structure dictating how individual simulation agents should behave, local, simple and to a certain degree random interactions between such simulation agents lead to the emergence of "intelligent" global behavior. Natural examples of SI include, but are not limited to, ant colonies, honey bee colonies, honey bee swarms, brains, fish schools, and locust swarms. Accordingly, SI algorithms include, but are not limited to, an Artificial Ant Colony Algorithm ("AACA"), an Artificial Bee Colony Algorithm ("ABCA"), an Artificial Honey Bee Swarm ("AHBS"), an Artificial Brain Algorithms ("ABA"), an Artificial Fish Swarm Algorithm ("AFSA"), and an Artificial Locust Swarm Algorithm ("ALSA"). AACAs, ABCAs, AHBSs, ABAs, AFSAs and ALSAs are well known in the art, and therefore will not be described in detail herein.

In some scenarios, other types of MOO algorithms are employed in addition to PSO algorithms and/or biologically inspired PSO algorithms for providing the cognitive capabilities of the cognitive network. The other types of MOO algorithms include, but are not limited to: a Normal Boundary Intersection ("NBI") algorithm; a modified NBI algorithm; a Normal Constraint ("NC") algorithm; a successive Pareto optimization algorithm; a Pareto Surface Generation ("PGEN") algorithm for convex multi-objective instances; an Indirect Optimization on the basis of Self-Organization ("IOSO") algorithm; an S-Metric Selection Evolutionary Multi-Objective Algorithm ("SMS-EMOA"); a Reactive Search Optimization ("RSO") algorithm; and/or a Benson's algorithm for linear vector optimization problems. Each of the listed MOO algorithms is well known in the art, and therefore will not be described herein.

Figure 7:
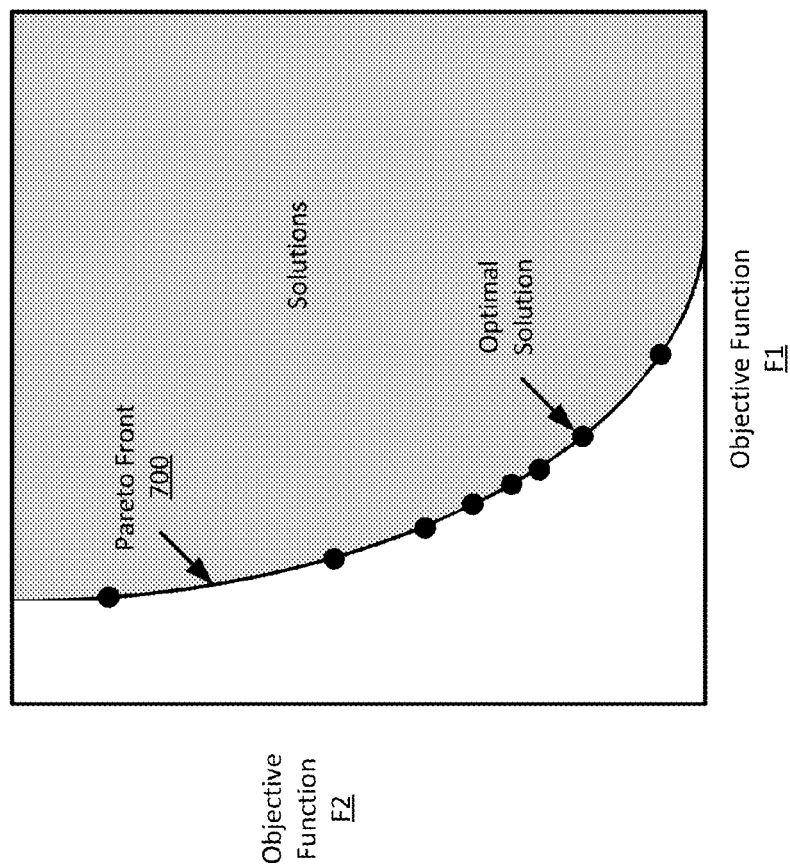
FIG. 7 is a graph illustrating an example of a Pareto front for two objective functions F1 and F2.

Still, it should be understood that every MOO algorithm (including PSOs, MOPSOs and biologically inspired PSOs) yields an N-dimensional Pareto Front of non-inferior solutions, where N is the number of objectives. The non-inferior solutions are solutions where any deviation along any objective axis results in that solution being dominated by a better solution. An example of a Pareto Front 700 for two objective functions F1 and F2 is shown in FIG. 7. Once the Pareto Front is formed, another algorithm can be used to select a best overall solution based on some a priori selected criteria.

Because MOO algorithms and their Pareto Fronts are elements of the present invention, a more detailed overview of these concepts is now presented. In many practical optimization based reasoning algorithms with multiple constraints (variables), MOO provides superior results since a single objective with several constraints may not adequately represent the problem. In MOO, instead of a large number of constraints, there is a vector of objectives, $F(x)=[F_1(x), F_2(x), \ldots, F_m(x)]$, that must be traded off in some way.

Let $G_i(x)$ be a constant or bound. MOO's goal is the minimization of the objective vector $F(x)$ subject to those constraints or bounds. That is:

$$\min_{x \in R^n} F(x), \text{ subject to}$$

$$G_i(x) = 0,$$

$$i = 1, 2, \ldots, k_e;$$

$$G_i(x) \leq 0,$$

$$i = k_e + 1, 2, \ldots, k;$$

$$l \leq x \leq u$$

where $k_e$ is the number of equality constraints. $k-k_e$ is the number of inequality constraints. l is the lower bound of x. u is the upper bound of x.

Note that because F(x) is a vector, if any of the components of F(x) are competing, then there is no unique solution to this problem. Instead, the concept of non-inferiority must be used to characterize the objectives. A non-inferior solution is one in which an improvement in one objective requires a degradation of another objective. To define this concept more precisely, consider a feasible region, $\Omega$, in the parameter space. x is an element of the n-dimensional real numbers $x \in R^n$ that satisfies all the constraints, i.e., $$x = \{\Omega \in R^n\}, \text{ subject to}$$

$$G_i(x) = 0, i=1,2,\ldots,k_e; G_i(x) \leq 0, i= k_e+1,2,\ldots,k; l \leq x \leq u$$

This allows for the following definition of the corresponding feasible region for the fitness function $\Lambda$.

$$\Lambda = \{y \in R^m : y = F(x), x \in \Omega\}.$$

The performance vector F(x) maps parameter space into fitness function space.

A non-inferior solution point is defined as: Point $x^* \in \Omega$ is a non-inferior solution if for some neighborhood of $x^*$ there does not exist a $\Delta x$ such that $(x^*+\Delta x) \in \Omega$ and $$F_i(x^*+\Delta x) \leq F_i(x^*), i=1,2,\ldots,m \text{ and}$$

$$F_j(x^*+\Delta z) < F_j(x^*) \text{ for at least one } j.$$

Figure 8:
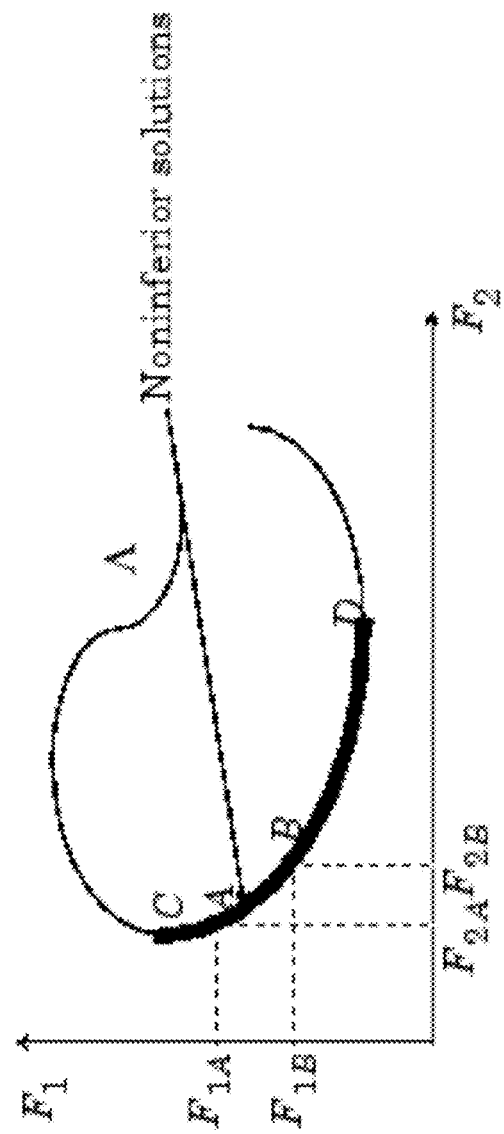
FIG. 8 is an exemplary two-dimensional representation of a figure set of non-inferior solutions.

An exemplary two-dimensional representation of a figure set of non-inferior solutions is provided in FIG. 8. As shown in FIG. 8, the set of non-inferior solutions lies on the curve between point C and point D. Points A and B represent specific non-inferior points. Points A and B are clearly non-inferior solution points because an improvement in one objective $F_1$ requires a degradation in the other objective $F_2$, i.e., $F_{1B} < F_{1A}$, $F_{2B} > F_{2A}$. Since any point in $\Omega$ that is an inferior point represent a point in which improvement can be attained in all the objectives, it is clear that such a point is of no value. MOO is therefore concerned with the generation and selection of non-inferior solution points. Non-inferior solutions are also called Pareto Optima. A general goal in MOO is constructing the Pareto Optima.

Exemplary Systems

Exemplary systems of the present invention will now be described in relation to FIGS. 9-11. The following discussion describes an approach implemented by a communication network 104 to select an optimal defensive algorithm for responding to network communication threats. When the cognitive and other functions required for command and control is distributed, various PSO algorithms are used as the basis of command and control communication. The PSO algorithms can be thought of as not only supplying some of the required machine intelligence, but also acting in an information compression roll for inter-node messages.

A cognitive network 104 can be multiple-parameter optimized so that its overall project or mission metrics are met, and not just one parameter that is either specific to a protocol stack layer or shared by only two protocol stack layers. PSO is employed by cognitive network 300 for achieving the multiple-parameter optimization. Such multiple-parameter optimization can include actions involved with selecting an optimal defensive algorithm in response to dynamic network conditions. In this regard, it should be understood that different PSO models can be used, each with properties aligned with the characteristics of a particular protocol stack layer, to form the basis of a distributed cross-layer cognitive engine. For example, a distributed biologically inspired PSO technique employing an AHBS is used for optimizing operations of a physical layer of an OSI protocol stack because of its messaging characteristics. A distributed biologically inspired PSO technique employing an AACA is used for optimizing operations of a data link layer of the OSI protocol stack because of its pheromone inspired finite fading memory and reinforcement property. The present invention is not limited to the particularities of this example. Other examples can be provided in which distributed biologically inspired and/or non-biologically inspired PSOs are used in protocol stack layers to minimize non-payload inter-node communication and which match the requirements thereof.

Notably, the PSO models and distributed intelligence algorithm parameters employed by cognitive network 104 can be dynamically adjusted during operations thereof. This dynamic adjustment can be made in accordance with changes in network requirements and network conditions. For example, the PSO models and distributed intelligence algorithm parameters may be dynamically changed based on changes in latency requirements, bandwidth requirements, and/or other communication requirements. Further the PSO models and distributed intelligence algorithm can be dynamically changed based in response to changes in attacks directed against the network.

Biologically inspired PSOs generally display many properties that are consistent with the cognitive requirements of networks that are required to coordinate themselves via RF communication to meet changing project, mission, radio environment, and policy conditions. The "particles" in biologically inspired PSOs are computation agents which communicate locally via simple messaging which collectively form an intelligent entity ("the swarm"). In the cognitive network 104 context, the computation agents comprise processing devices 306 contained in the secure core 300 of each network node 102. The processing devices 300 form a distributed processor which is instantiated in each of the network nodes. The distributed processor includes hardware (i.e., electronic circuits) and/or firmware configured to perform the basic concepts described below in relation to FIG. 9 and methods described below in relation to FIG. 10.

A function of the distributed processor described herein is select optimal defensive algorithms to keep the network operation near optimal with a minimum of overhead in ever changing requirements and conditions. Notably, as a consequence of using biologically inspired PSOs, the computational loading can be dynamically partitioned across all active network nodes 102 based on the number of network nodes, node information density, and system level computational requirements. This is beneficial when the computational capability of the cognitive network 104 grows asymptotically and when the computational capacity of the cognitive network 104 exceeds the asymptotic limit of the computational requirement. The computational load of each network node 102 can be scaled back as more nodes join the network 104, thus reducing the power draw of each network node 102 to extend the life of the power source and likely decrease its heat and electromagnetic radiation signature.

Figure 9:
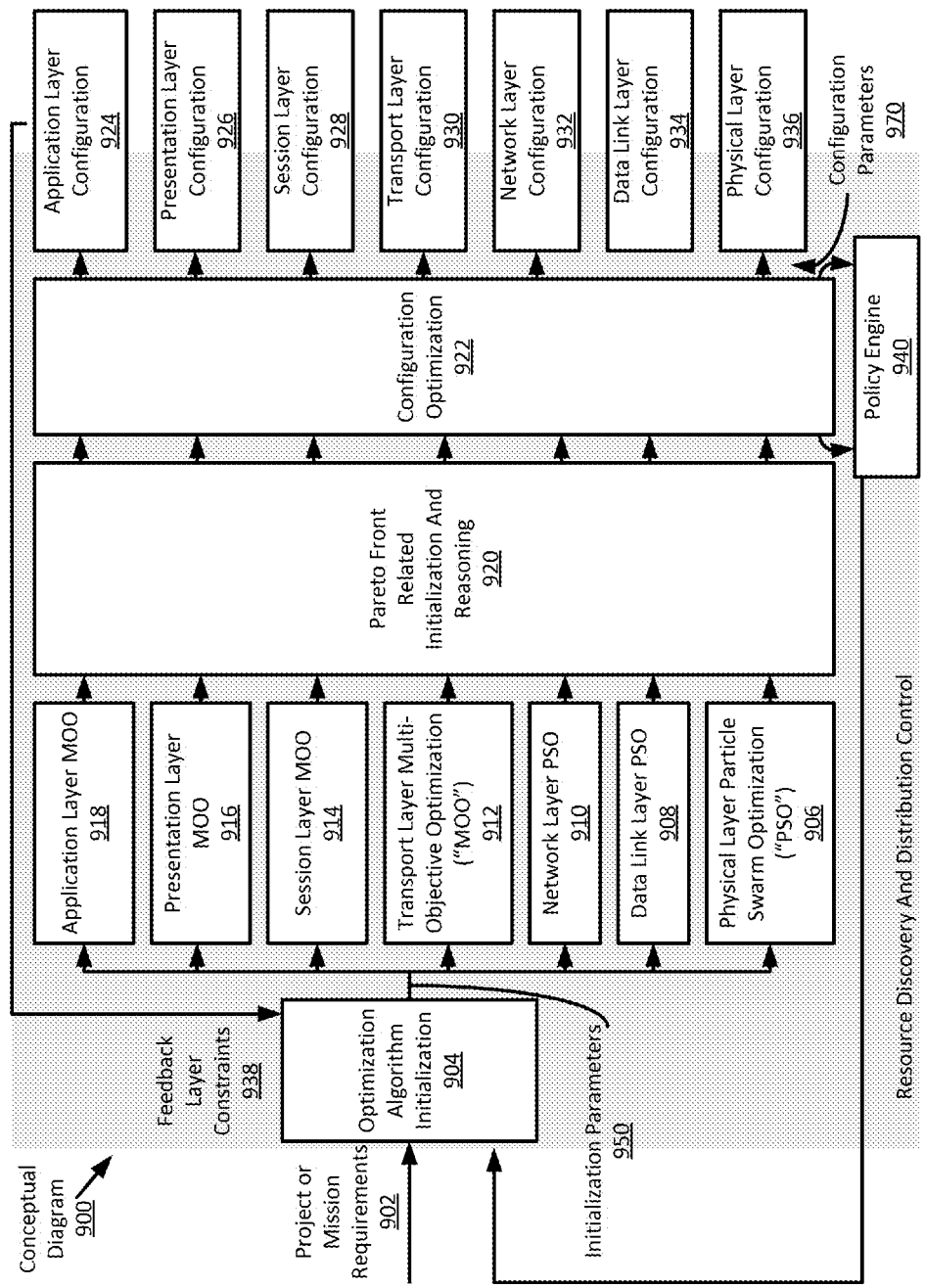
FIG. 9 is a diagram that is useful for understanding basic concepts employed by the cognitive network of FIG. 2.

Referring now to FIG. 9, there is provided a conceptual diagram 900 that is useful for understanding operations performed by distributed cognitive network 104. As noted above, cognitive network 104 generally employs a distributed intelligence algorithm for optimizing its overall performance. For example, the cognitive network can employ a distributed SCNM intelligence in the form of cognitive engines respectively provided in each node as part of the distributed components 514. The distributed SCNM intelligence determines optimal network configurations including defensive algorithms which are to be employed in response to dynamic network conditions, such as attacks directed against the network. From a hardware perspective, the distributed intelligence is implemented in the form of the distributed processors (e.g. processor 306) which are instantiated in the secure cores 300 of network nodes 102 forming the cognitive network 104. Accordingly, the actions of functional blocks 904-940 of conceptual diagram 900 are achieved by performing corresponding operations at the distributed processor defined by the network nodes.

As shown in FIG. 9, new or updated project or mission requirements 902 are received by the distributed processors as implemented in the secure cores 300 of nodes 102 in the cognitive network 104. The project or mission requirements 902 may be in a standard ontology. The standard ontology represents project or mission requirements as a set of concepts within a domain, and the relationships among these concepts. As such, in some scenarios, the ontology includes a plurality of terms and an index. The index defines a plurality of relationships between the terms and project/mission requirements 902. A project or mission requirement is identified based on at least one term and the index.

After receiving the project or mission requirements 902, operations for optimization algorithm initialization are performed in functional block 904. Such operations include using at least one AI algorithm and/or at least one Table Look Up ("TLU") method to compute initialization parameters 950 for a plurality of distributed optimization algorithms which collectively are to be used to optimize performance of the cognitive network 104. In the case where there is an indication of a network attack, the AI algorithm may determine that optimized performance requires implementation of a particular defensive algorithm. In some scenarios, the AI algorithm includes, but is not limited to, a symbolic AI algorithm, a sub-symbolic AI algorithm, or a statistical AI algorithm. Each of the listed types of AI algorithms is well known in the art, and therefore will not be described herein.

Also, the type of AI algorithm(s) and/or initialization parameter(s) can be selected in accordance with a particular "use case". The term "use case", as used herein, refers to a methodology used in system analysis to identify, clarify, and organize system requirements. A "use case" is made up of a set of possible sequences of interactions between system components (e.g., network nodes) and users in a particular environment and related to a particular goal. A "use case" can have the following characteristics: organizes functional requirements; models the goals of system/user interactions; records paths from trigger events to goals; describes one main flow of events and/or exceptional flow of events; and/or is multi-level such that another "use case" can use the functionalities thereof.

The functions of block 904 are achieved using feedback layer constraints 938 derived from successful project or mission executions. For example, the feedback layer constraints 938 may specify instances where a particular defensive algorithm has been effective for responding to a particular type of network attack. Block 904 uses the successful project or mission feedback layer constraints to "learn" and to later use said successful project or mission feedback layer constraints to generate initialization parameters in future similar use cases. The "learning" mechanisms for the aforementioned algorithms are well known in the art, and therefore will not be described in detail herein. These inputs are then used to determine a previously seen similar set of circumstances and the corresponding end results. The end results are then used for initialization. The feedback layer constraints 938 include information concerning the status and constraints that apply to protocol stack layer resources of at least one network node.

The functions of block 904 are also achieved using network-related information concerning the resources that are available on each network node 102. In some scenarios, the network-related information includes, but is not limited to, a free computational capacity of each network node, a reserve power of each network node, and/or a spectral environment of each network node. Also, the network-related information may be updated on pre-defined periodic bases.

In some scenarios, the operations of functional block 904 are performed in a distributed fashion in which all network nodes assist in computing the initialization parameters 950. However, in other scenarios, the initialization parameters 950 are computed by a single network node, and then distributed to the remaining network nodes. Still, in yet other scenarios, the initialization parameters 950 are computed using only a select few of the network nodes, and then distributed to the remaining network nodes. In the last scenarios, geographically close network nodes are grouped so as to define a sub-cognitive network. One of the network nodes of the sub-cognitive network is selected to compute the initialization parameters for itself and the other network nodes of the sub-cognitive network. Such a sub-cognitive network configuration is power and security efficient.

Once the initialization parameters 950 have been computed, they are distributed to functional blocks 906-918, respectively. In functional blocks 906-918, the initialization parameters 950 and/or the network-related information are used for determining possible outcomes that are Pareto efficient when different values for protocol stack layer parameters are employed. In this regard, a Pareto Front for at least one distributed MOO algorithm can be determined in each functional block 906-918. Pareto Fronts are well known in the art, and briefly described above.

In some scenarios, a Pareto Front for at least one distributed MOO algorithm is determined in each functional block 906-910 which may result in protocol optimization of a physical layer, a data link layer, or a network layer. As noted above, such protocol optimization can involve selection and implementation of one or more specific defensive algorithms employed by the network to thwart attacks directed against the network. As shown in FIG. 9, the distributed MOO algorithms employed in functional blocks 906-910 can include distributed biologically inspired PSO algorithms. The present invention is not limited in this regard. Functional blocks 906-910 can additionally or alternatively employ other types of MOO algorithms. Similarly, a Pareto Front for at least one distributed MOO algorithm is determined in each functional block 912-918 which may result in protocol optimization of a transport layer, a session layer, a presentation layer, or an application layer. As shown in FIG.

9, the MOO algorithms employed in functional blocks 912-918 include MOO algorithms other than PSO algorithms. The present invention is not limited in this regard. Functional blocks 912-918 can additionally or alternatively employ PSO algorithms, and more particularly distributed biologically inspired PSO algorithms.

The number and types of MOO algorithms employed for each protocol stack layer can be selected in accordance with a particular "use case". The same or different type of distributed MOO algorithm can be used for optimizing protocols of each of the protocol stack layers. For example, a first distributed biologically inspired PSO (e.g., a distributed AHBS) can be used for optimizing protocols of a data link layer and/or a physical layer of an OSI protocol stack. A second different distributed biologically inspired PSO (e.g., a distributed AACA) can be used for optimizing protocols of a network layer of the OSI protocol stack. A first distributed MOO (e.g., a distributed SMS-EMOA algorithm) and/or a third distributed PSO can be used for optimizing protocols of a transport layer of the OSI protocol stack. A second different distributed MOO (e.g., a distributed successive Pareto optimization) and/or a fourth distributed PSO can be used for optimizing protocols of a session layer, presentation layer, and/or application layer of the OSI protocol stack. The third and fourth distributed PSOs can be the same as or different than the first distributed biologically inspired PSO or second distributed biologically inspired PSO. The present invention is not limited in this regard.

Notably, the distributed MOO algorithm(s) used in each functional block 906-918 may be unique thereto and/or customized to the requirements of a respective protocol stack layer. Also, the distributed MOO algorithm(s) for each protocol stack layer is (are) part of a larger distributed intelligence algorithm implemented by the plurality of network nodes 102. In this regard, inter-node communications may or may not be required for facilitating functions of blocks 906-918. If inter-node communications are required for facilitating functions of a block 906-918, then the inter-node communications may or may not be part of the larger distributed intelligence algorithm. At least one distributed PSO is employed in a functional block 906-918 as the distributed MOO algorithm when the inter-node communications therefore comprise part of the larger distributed intelligence algorithm.

After the Pareto Fronts have been calculated for all of the protocol stack layers, additional computations are performed in functional block 920 to develop the best overall network solutions. The term "best overall network solution", as used herein, refers to an optimal solution for overall protocol stack configuration given at least the current network architecture, current network environment (including the status of any attacks directed upon the network), low-level events detected at individual nodes by node level event detection/monitoring modules, current network conditions, current project or mission requirements, and current project/mission objectives. In the event that an attack upon the network or upon an individual node has been detected, the best overall network solution can advantageously include a selection of at least one high-level defensive algorithm. The defensive algorithm will be applied at each node for responding to an attack directed upon the network and/or a particular node or nodes.

The functions of functional block 920 may be implemented in a distributed fashion in which a plurality of network nodes perform some of the "additional computations" or a centralized fashion in which a single network node performs all of the "additional computations". The additional computations involve: applying another set of algorithms to the entire solution spaces including the Pareto Fronts; developing the best overall network solutions based on the solutions for the algorithms; and ranking the best overall network solutions according to a set of criteria appropriate to a specific application space and conditions in which the cognitive network is operating.

The set of algorithms used in functional block 920 can include, but are not limited to, Case-Based Reasoning ("CBR") algorithms, expert system algorithms, and neural network algorithms. Such algorithms are well known in the art, and therefore will not be described in detail herein. Still, it should be understood that inputs to functional block 920 may include, but are not limited to, project-related inputs, mission-related inputs, network topology inputs, and/or RF environment inputs. These inputs are then used to determine a previously seen similar set of circumstances and the corresponding end result. The end results are then used for initialization of configuration optimization. If a CBR algorithm or a neural network algorithm is used in functional block 920, then the end results may be fed back for use in a next iteration of said algorithm. In contrast, if expert system algorithms are employed in functional block 920, then the end results may not be fed back.

The ranked "best overall network solutions" are then analyzed in functional block 922 to: identify which solutions are compliant with project/mission policies; and identify a top ranked solution from the identified solutions. Depending on the current operating environment, the top ranked solution can include a particular defensive algorithm which is to be used for responding to an attack. For example, such a defensive algorithm may be specified in the case where one or more conditions indicate that the network or an individual node is experiencing an attack.

If no ranked "best overall network solutions" are policy compliant, then a policy engine 940 attempts to "suggest" possible approaches that would bring the cognitive network system 104 into compliance. The "suggested" possible approaches are then supplied to functional block 922 first. In response, a second iteration of the functions of block 922 are performed for use thereby to generate policy compliant solutions. If functional block 922 cannot generate a compliant solution the "suggested" possible approaches are then supplied to functional block 904 for use thereby. In response, a second iteration of the functions of blocks 904-922 are performed to generate policy compliant solutions.

If at least one ranked "best overall network solutions" is policy compliant, then a "favored solution" is selected in functional block 922. If an attack or event has been reported by one or more nodes, the favored solution can optionally specify, among other criteria, a defensive algorithm to be used for responding to such attack. Similarly, if the occurrence of certain high-level conditions are detected which correspond to attacks directed to the SCNM, a defensive algorithm can be specified as part of the network solution chosen in block 922. Once selected the optimal solution has been selected, configuration parameters 970 are computed for the protocols of the protocol stack layers that enable an implementation of the "favored solution" within the cognitive network 104. Subsequently, the network resources of the protocol stack layers are configured in accordance with the respective configuration parameters 970, as shown by functional blocks 924-936. These actions can be performed by the CIM 504 executing in each node.

The network resources remain in their current configuration until the project or mission changes, the network topology changes and/or the network's operating environment changes. Accordingly, events detected at the node level which are indicative of low-level attacks, and unexpected changes in the behavior of the network can trigger the selection of a new network solution as shown in FIG. 9.

Figure 10:
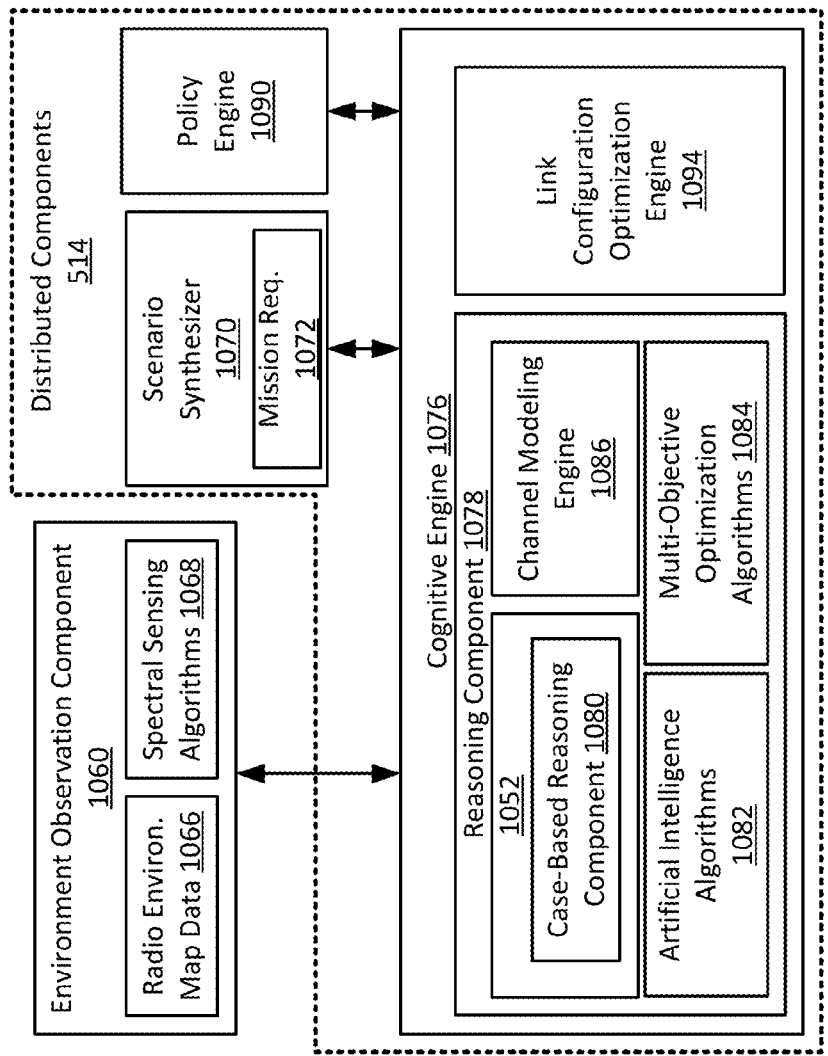
FIG. 10 is a detailed block diagram that is useful for understanding the distributed components included in the network nodes.

Referring now to FIG. 10, there is provided a detailed bock diagram showing certain distributed components 514 residing in a secure core of an exemplary network node 102. As explained above, a network node 102 includes at least one processing device 306, which together with similar processing devices 306 in other nodes 102 will comprise a part of a distributed processor. The distributed components 514 in each network node 102 are hosted on processing devices 306 respectively in each network node. The distributed processor employs a distributed intelligence algorithm for facilitating the optimization of the overall performance of the cognitive network 104. As such, the distributed processor includes hardware (e.g., electronic circuits) and/or firmware configured to perform the operations described above in relation to FIG. 9 and the method described below in relation to FIG. 11. The processing device 306 of each network node 102 will also host an Environment Observation Component ("EOC") 1060. The EOC can sense frequency channels that are available for use by the cognitive network.

As described above, initialization parameters 950 for the distributed intelligence algorithm are computed during operation of the cognitive network 104. In some scenarios, some or all of the initialization parameters are computed by one or more network nodes 102. Accordingly, cognitive engine 1076 of network node 102 includes an optional Initialization Parameter Generator ("IPG") 1052. IPG 1052 is configured to use project or mission requirements 902, feedback layer constraints 938 and/or network-related information for computing the initialization parameters for the MOO algorithms 1084 employed by itself and/or other network nodes 102. The initialization parameters can be computed using at least one AI algorithm 1082 and/or TLU method. The type of AI algorithm 1082 or initialization parameters can be selected in accordance with a particular "use case", as described above. If the IPG 1052 computes initialization parameters for other network nodes, then network node 102 communicates the initialization parameters to those other network nodes, respectively. The initialization parameters can be communicated via command and control communication. After the initialization parameters have been computed, the network node 102 uses the respective initialization parameters and/or network-related information to facilitate the optimization of overall network performance, including implementation of any defensive strategies.

In some scenarios, the initialization parameters are computed using CBR and/or fuzzy algebra. CBR and fuzzy algebra are well known in the art, and therefore will not be described in detail herein. However, a brief discussion of the operations performed by the network node 102 for computing the initialization parameters is provided below to assist a reader in understanding CBR scenarios.

In the CBR scenarios, the IPG 1052 includes a CBR component 1080 that is generally configured to receive case-related information from EOC 1060 and process the same. In this regard, the EOC 1060 performs operations to generate a Full Characterization of the Network Node Environment ("FCNNE"). FCNNE is generated by combining hardware resource data stored at a node 102 with Radio Environment Map ("REM") data 1066. The REM data 1066 characterizes a static local network node environment (e.g., hidden nodes, terrain, etc.) and distant network node environments. The REM data 1066 is updatable via command and control communication. FCNNE is then communicated from the EOC 1060 to the scenario synthesizer 1070.

At the scenario synthesizer 1070, FCNNE is combined with the current project or mission requirements 1072 so as to synthesize a set of objectives, limits, and boundary conditions for the cognitive engine 1076. The objectives may be stored in a memory (e.g. main memory 302) in a particular format (e.g., a table format). Thereafter, the objectives are combined with the radio hardware environment data to generate combined objective/environment data. The combined objective/environment data is used by the scenario synthesizer 1070 to generate at least one case identifier. The case identifier(s) is(are) then communicated to the CBR component 1078 of the cognitive engine 1076. The CBR component 1078 uses the case identifier(s) to: select the number of MOO algorithms that should be employed for each protocol stack layer; select the type of MOO algorithm(s) to be employed for each protocol stack layer; and/or determine the initialization parameters for the MOO algorithms 1084.

Once the initialization parameters have been determined, they are used by the cognitive engine 1076 to facilitate optimization of protocol stack performance, and determine whether a defensive strategy is needed. In this regard, a Pareto Front for each selected MOO algorithm 1084 is determined. Notably, the MOO algorithms 1084 comprise at least one MOO algorithm for each protocol stack layer that is unique thereto and/or customized to the requirements thereof. The same or different MOO algorithm can be used for two or more of the protocol stack layers. In some scenarios, a PSO algorithm (more particularly, a biologically inspired PSO algorithm) is employed for at least one of the protocol stack layers (e.g., a physical layer, a data link layer, and/or a network layer). Each of the MOO algorithms (including PSOs and biologically inspired PSOs) yields an N-dimensional Pareto Front of non-inferior solutions, as described above.

As noted above, the MOO algorithms are part of a larger distributed intelligence algorithm implemented by network nodes 102 of the cognitive network 104. In this regard, inter-node communications may be required for computing the Pareto Fronts. Accordingly, in some scenarios, network node 102 communicates with other network nodes 102 using command and control communications for purposes of deriving a solution to one or more MOO algorithms 1084.

After the cognitive engine 1076 generates a Pareto Front, it communicates the Pareto Front to the policy engine 1090. Notably, the policy engine 1090 forms part of a distributed policy engine. The functions of such a distributed policy engine are described above in relation to functional block 940 of FIG. 9. At least some of the functions described above in relation to functional block 940 of FIG. 9 are performed by policy engine 1090.

In this regard, additional operations are performed by the policy engine 1090 to facilitate the development of the best overall network solutions. The additional operations involve: applying additional algorithms at least to the Pareto Fronts generated by cognitive engine 1076; assisting in the development of the best overall network solutions based on the solutions to the additional algorithms; and assisting in the ranking of the best overall network solutions according to a set of criteria appropriate to a specific application space and conditions in which the cognitive network 104 is operating. The additional algorithms can include, but are not limited to, CBR algorithms, expert system algorithms, and/or neural network algorithms.

Subsequently, the policy engine 1090 assists in the analysis of the ranked best overall network solutions to: identify which solutions are compliant with current regulatory policies and/or project/mission policies; and identify a top ranked solution from the identified solutions. The top ranked solution can include one or more high-level defensive actions or algorithms to be performed by the network 104 for thwarting a particular attack. The solution can also specify responses to individual nodes to detected events indicative of low-level attacks at the node level or high level node conditions that are at variance with expectations.

Policy compliance can be determined using the boundary conditions generated by scenario synthesizer 1070. If no ranked best overall solutions are policy compliant, then the policy engine 1090 assists in a determination of possible approaches that would bring the cognitive network 104 into compliance. The possible approaches are feedback to the MOOA component 1084 or the CBR component 1080 to give direction regarding how the solution can be brought into compliance. There is no fixed process for how the MOOA component 1084 or the CBR component 1080 uses the fed back information.

If at least one ranked best overall solutions is policy compliant, then it is passed to a Link Configuration Optimization ("LCO") engine 1094. The LCO engine 1094 uses a radio resource cost function to down select to a single configuration solution. The solution is evaluated to assess quality. Ultimate a solution is selected on this basis, and the solution can include one or more of the high-level defensive algorithms described herein for thwarting attacks directed against the network. The solutions can also include defensive actions to be implemented at individual nodes and specified on a node-by-node basis.

Exemplary Methods for Selecting Network Configurations and Defensive Actions

Figure 11:
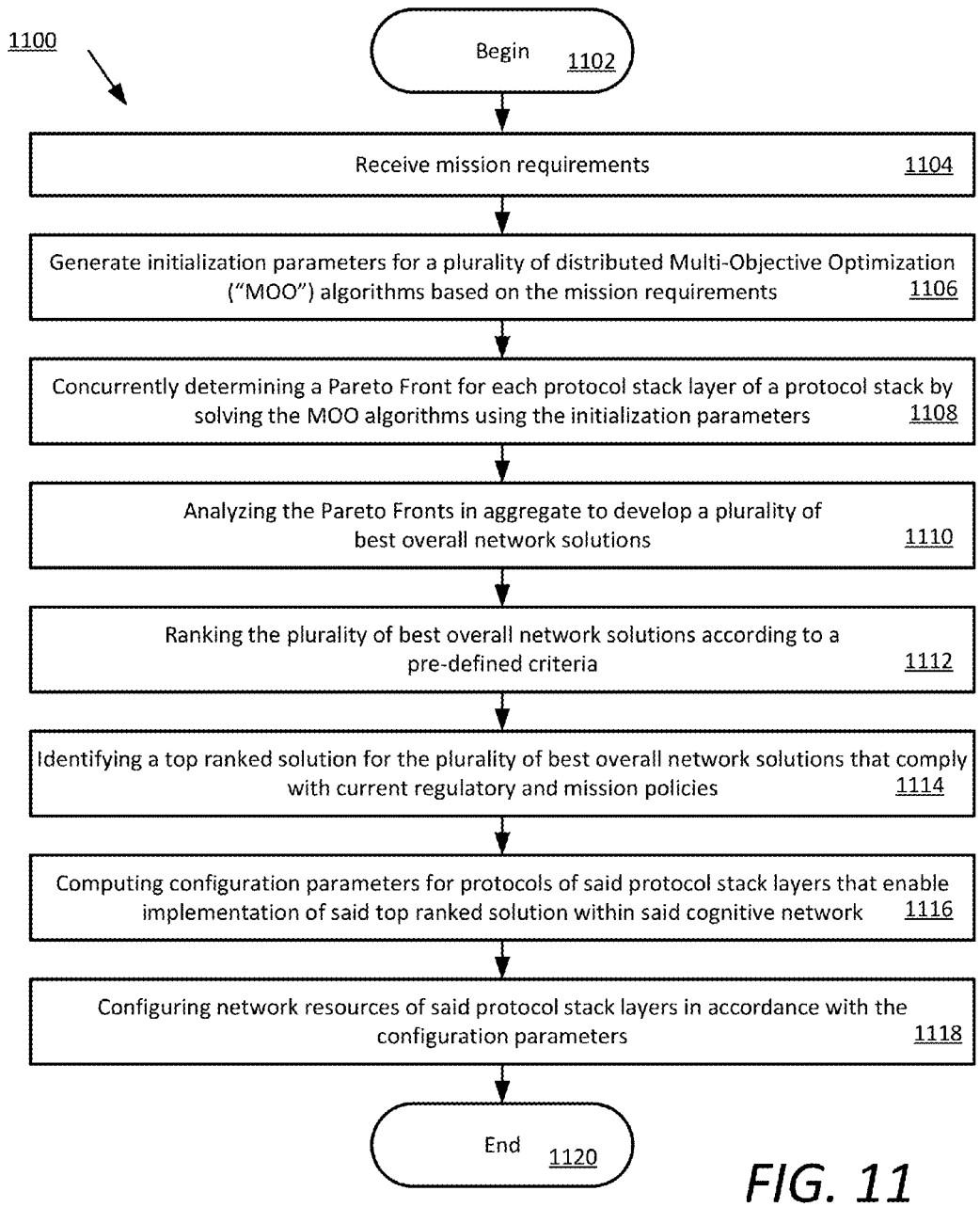
FIG. 11 is a flow diagram of an exemplary method for providing a cognitive network.

Referring now to FIG. 11, there is provided a flow diagram of an exemplary method for providing a cognitive network (e.g., cognitive network 104 of FIG. 3) that is useful for understanding the present invention. As shown in FIG. 11, method 1100 begins with step 1102 and continues with step 1104. In step 1104, project or mission requirements (e.g., project or mission requirements 902 of FIG. 9) are received. The project or mission requirements are then used in step 1106 to generate initialization parameters for a plurality of MOO algorithms.

The initialization parameters can be generated using at least one AI algorithm and/or TLU method. The AI algorithm can include, but is not limited to, a CBR algorithm and/or a fuzzy algebra algorithm. The type of algorithm used in step 1106 may be selected in accordance with a use case. The use case can be made up of a set of possible sequences of interactions between network components and users in a particular environment. In this regard, the initialization parameters may be generated using: information specifying a status and constraints that apply to protocol stack layer resources of at least one network node; and/or information concerning resources that are available on each network node of the cognitive network.

In some scenarios, step 1106 is performed in a distributed fashion in which all network nodes of the cognitive network assist in generating the initialization parameters. In other scenarios, step 1106 is performed in a centralized fashion in which a single network node generates the initialization parameters. In yet other scenarios, step 1106 is performed in a semi-distributed fashion in which only a select few of the network nodes assist in the generation of the initialization parameters.

Once the initialization parameters have been generated, they are used to determine at least one Pareto Front (e.g., Pareto Front 700 of FIG. 7) for each protocol stack layer of a protocol stack, as shown by step 1108. The Pareto Fronts are determined by solving the distributed MOO algorithms. At least one of the distributed MOO algorithms comprises a biologically inspired PSO algorithm. In some scenarios, the biologically inspired PSO algorithm is used for a physical layer, a data link layer, and/or a network layer of a protocol stack. Also, a different type of distributed MOO algorithm may be employed for at least two of the protocol stack layers. The type of distributed MOO algorithm to be employed for at least one protocol stack layer can be selected based on an amount of non-payload inter-node communication and requirements of the protocol stack layer. Similarly, the number of distributed MOO algorithms to be employed for at least one protocol stack layer is selected based on an amount of non-payload inter-node communication and requirements of the protocol stack layer.

In a next step 1110, the Pareto Fronts are analyzed in aggregate to develop a plurality of best overall network solutions. One or more of these solutions can include implementation of a network defensive algorithm for thwarting an attack upon the network. The best overall network solutions can be developed using a case-based reasoning algorithm, an expert system algorithm or a neural network algorithm. The best overall network solutions are then ranked according to a pre-defined criteria, as shown by step 1112. A top ranked solution is identified in step 1114 for the best overall network solutions that comply with current regulatory policies and/or project/mission policies. Subsequent to completing step 1114, step 1116 is performed where configuration parameters are computed for protocols of the protocol stack layers that enable implementation of the top ranked solution within the cognitive network. If the top ranked solution includes the implementation of a network defensive algorithm, the configuration parameters will specify actions to be performed for implementing such algorithm. The top ranked solution is implemented in the cognitive network by configuring the network resources (e.g., hardware and software resources of the various network nodes 102 of FIG. 2) thereof in accordance with the configuration parameters, as shown by step 1118. This step also includes implementing the selected high-level defensive algorithm at one or more of the nodes, and implementing any low-level defensive actions that are determined to be necessary with respect to individual nodes. The low-level defensive strategies implemented at individual nodes can be performed on a node-by-node basis. Upon completing step 1118, step 1120 is performed where method 1100 ends or other processing is performed.

Exemplary High-Level Defensive Algorithms Used in SCNM

A high-level defense algorithm as described herein is one which will substantially eliminate, or mitigate, attacks directed upon a CNM infrastructure by an adversary. High-level defensive algorithms as referenced herein can include any algorithm, action or protocol implemented at the network level (as opposed to algorithms performed with respect to an individual node) that function to defeat attacks upon the cognitive network. Accordingly, many different types of defensive algorithms are possible for use with the inventive arrangements described herein. Still, it has been determined that there are three basic types of high-level defensive algorithm that are sufficient to mitigate most potential high-level attacks on a cognitive network. These high-level algorithms include (1) multi-layer address hopping (2) network and link interface migration, and (3) dynamic topology management. Algorithms of this type are known in the art and therefore will not be described in detail. However, a brief discussion of each defensive algorithm to facilitate understanding of the invention.

Multi-Layer IP Hopping

Multi-layer hopping involves frequent pseudo-random changes to node IP and/or MAC addresses. Multi-layer hopping is expected to mitigate the effects of targeted packet dropping, packet injection and modification, as it makes it difficult for an attacker to identify specific sessions or flows in the network. For distributed tactical networks, and in particular, for tactical networks operating in a mesh mode, pseudorandom changes in IP address alone are not necessarily sufficient to enable effective hopping. Accordingly, simultaneous hopping is advantageously enabled by the CIM at both the data link and network layers (i.e. layers 2 and 3 of the OSI stack). This approach reduces the chances of an attacker compromising the hopping strategy by simply tracking layer 2 frame addresses. Various types of IP hopping schemes are known in the art. Accordingly, the IP and MAC address hopping methods will not be described here in detail. However, it should be understood that any suitable technique for implementing and coordinating an IP hopping scheme can be used, provided that is resistant to exploitation.

Network and Link Interface Migration

As is known, high layer protocols in a communications stack are conventionally designed to detect and compensate for temporary failures in the communications link. Numerous windowing techniques and application level acknowledges are often used, especially in tactical network environments, to account for the unreliability of the link. While reasonably effective against transient link failures and instabilities, these higher-level techniques can be completely ineffective against malicious disruptions. In fact, when properly timed and coordinated, conventional error correction and transmission techniques can be used against the infrastructure itself, amplifying or enabling the effects of the attack. For these kinds of scenarios, a multi-link coordination algorithm is provided that allows nodes to contextually utilize redundant links to mitigate this class of attacks.

Figure 12:
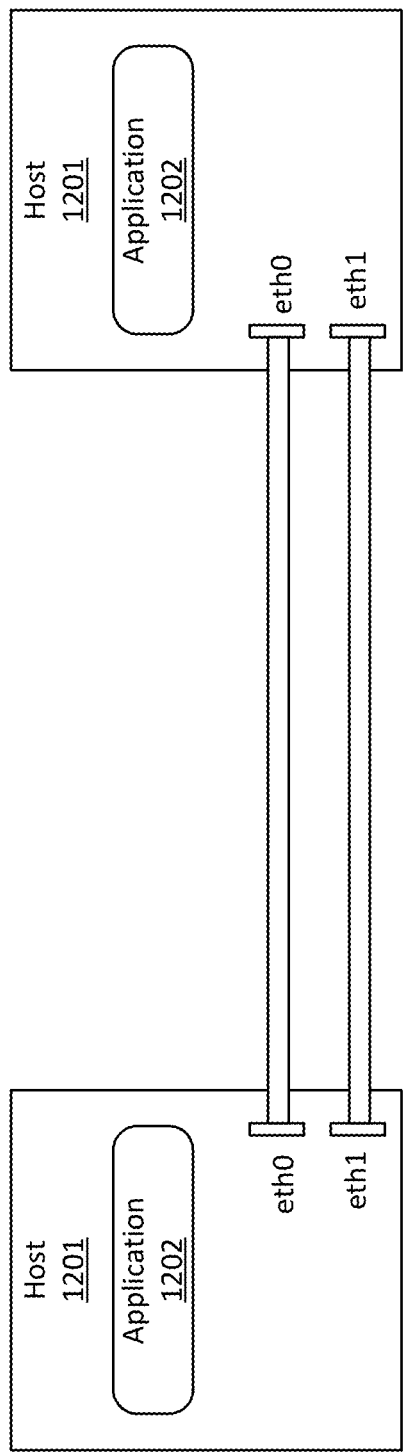
FIG. 12 is a diagram that is useful for understanding conventional communications between two nodes of a network.

The approach is centered on the notion of creating a logical link implemented as a collection of redundant physical links. Consider, for example, the conventional scenario illustrated in FIG. 12 which shows two host computing devices 1201 which are communicating in a network environment. Each host is executing one or more software applications 1202 which communicate with applications in other host computing devices. The applications executing on the hosts in this example can communicate data by means of two links, eth0, eth1. The links are assumed to be non-interfering, but not necessarily with the same capacity, or even operating in the same network. In this exemplary scenario, the applications on each host computing device will exchange information based on the interface to which they are bound, the availability of the links, and/or the order in which the operating system on the sender's side has registered each interface.

In the above-described scenario, consider the case where an application is bound to an address associated with one of the interfaces (for example, eth0). Under normal circumstances, the sending application would need to send the data through its eth0 interface (which in this diagram corresponds to the link connected to interface eth0 at the receiver's side). Alternatively, the applications could be available on all interfaces, in which case the sending application would choose one of the links to use. Neither situation is ideal for purposes of mitigating attacks upon the network.

Figure 13:
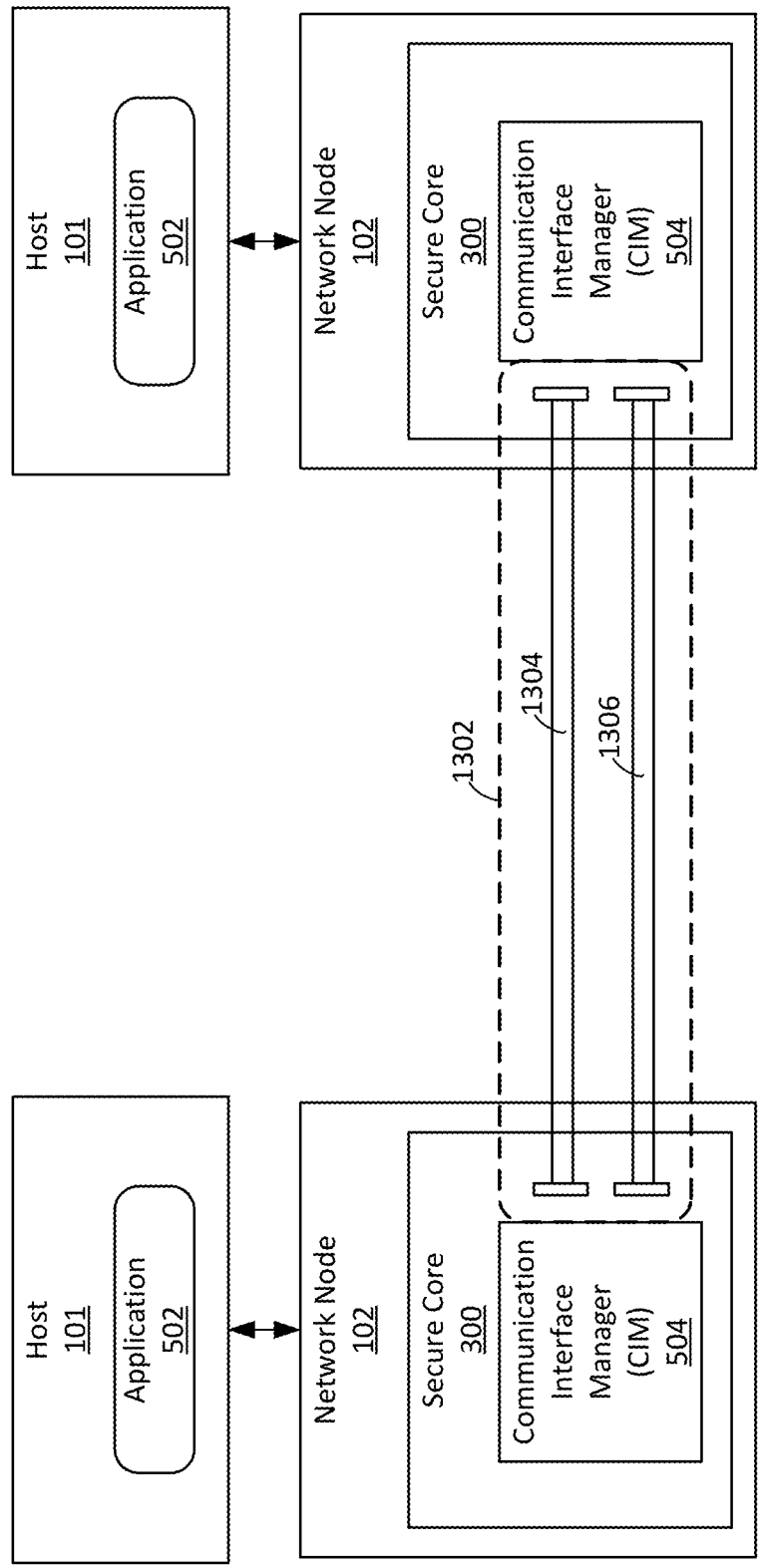
FIG. 13 is a diagram that is useful for understanding a link management defensive function performed by a plurality of network nodes.

Referring now to FIG. 13, there is shown a preferred arrangement for managing communications in an SCNM system as described herein. Each host computing device 101 executes at least one application 502 as described above. The host computing device communicates with secure core 300 residing in network node 102 and further includes a communication interface manager (CIM) 504 as described above. The CIM advantageously abstracts multiple physical layer links 1304, 1306 into a single logical link 1302 that is managed by the CIM. Consequently, regardless of the application bindings on each host application 502, the CIM will choose the best link for data transmission, and will also take advantage of both links 1304, 1306 to effectively split the transmission of frames between host computing devices as needed.

According to one aspect of the invention, links can be managed by the CIMs 504 to support capacity maximization, reliability, or adaptive data transmission. Multi-link management techniques are known in the art and therefore will not be described here in detail. However, for purposes of SCNM, the link management capability described herein will advantageously include managing the links 1304, 1306 to provide a fully redundant transmission mode using a plurality of available links under conditions where adaptive link disruption network attacks are suspected, or anticipated.

Under conditions where the links are managed to provide fully redundant transmissions of communications between nodes, each frame received from an application 502 is duplicated and transmitted simultaneously on all links 1304, 1306. The redundant transmission across non-interfering links 1304, 1306 makes it harder for a cognitive jammer to selectively disrupt the communication flow and thereby cause instabilities in the system.

The downside of using the links redundantly is a reduction in overall capacity of the link 1302. By duplicating all frames across both links, the overall logical capacity is limited by the smallest bandwidth of the links. Therefore, in accordance with one aspect of the invention, the CIM will advantageously use the available links 1304, 1306 to maximize capacity when possible, and to maximize reliability when necessary. More particularly, the CIMs 504 will dynamically respond to each communication context by using the multiple redundant links to maximize capacity or reliability, as communication conditions change. In this regard it should be noted that there are no requirements with regard to the capacity or similarity between links 1304, 1306 that are managed. The multi-link algorithm used by the CIM for this purpose will advantageously support the load balance against different links, and the full synchronization of links, to maximize capacity, or reliability.

Further, the CIM 504 in each network node can advantageously transmit frames on each link with a timing offset to reduce the effectiveness of adaptive wide-band jammers. In other words, the same frame may be sent on different links at slightly different times (rather than being synchronized) so that an adaptive wide-band jammer will be less likely to cause interference to both frames.

Topology Control

A third level of defense that is implemented by the CIM 504 is based on topology control. The purpose of topology control, in this context, is to allow for the SCNM infrastructure to respond to localized threats with a broad change in the physical topology of the network. From a network topology perspective there are at least two levels of control that can be used to support or augment the distributed coordination algorithms for network management. At a first level, the physical network topology establishes the specific links between nodes. The physical topology of the network is a function of many variables, including the connectivity settings, geographical distribution of nodes, mobility, and environmental effects. In cognitive network management, it is often the case that some of the physical properties of transmitters and receivers (such as transmission power, waveforms, directionality, etc.) are also manipulated to control the physical topology.

A second level of topology control happens at the network layer, when different nodes choose to favor communications through specific links by defined higher-level routes between those neighbor nodes that will be used by applications. The network layer, in this case, is used to identify the broader paths for data flows, given local link conditions. It is important to note that topology management at OSI layer three (the network layer) does not affect the way that transmissions occur at the local level. That is, despite how routes are defined, the local transmissions will always happen in accordance with the characteristics of the local RF topology.

Figure 14:
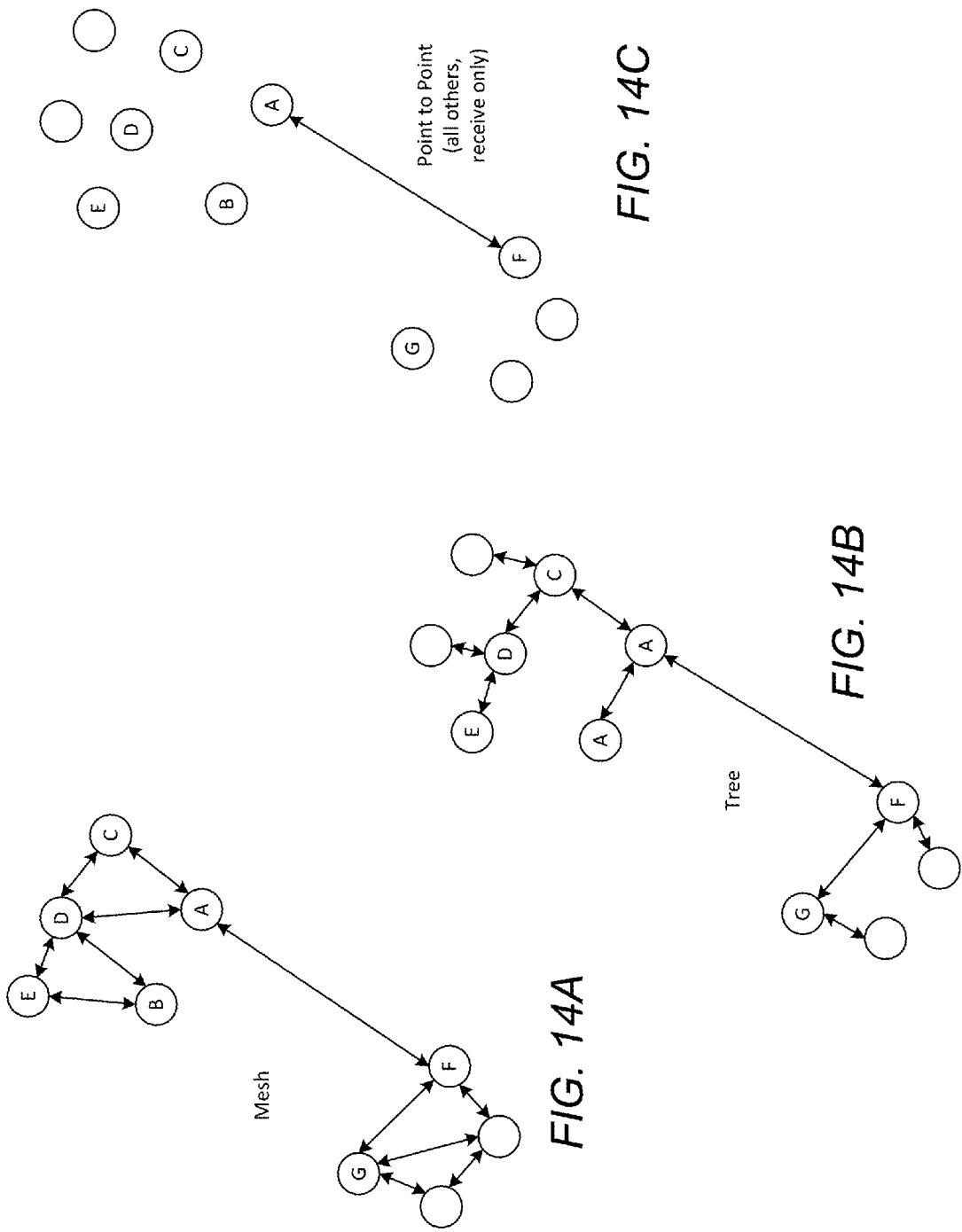
FIG. 14A-14C are drawings which are useful for understanding different network topologies that can be used by a high-level defensive algorithm.

According to one aspect of the invention, a reactive topology control algorithm implemented by the SCNM uses the CIM to construct at least three types of topologies based on system requirements and operational context. The three or more target topologies, including: a) a mesh topology, b) a tree topology, and c) a point-to-point (p2p) topology. In FIGS. 14A-14C, each of the proposed topologies is illustrated. The mesh topology, the tree topology, and the point-to-point topologies can each be constructed by SCNM when necessary. More particularly, when a threat is perceived, the SCNM can use the CIM in each node to dynamically disassemble and reassemble any one the topologies currently in use, in favor of a different topology. In all cases, SCNM builds the different topologies at the physical level.

In an exemplary embodiment, the topology management implementation can use the CIM to control a combination of transmitter power and transmission frequency to build the different topologies at the physical level. However, the invention is not limited in this regard and any suitable method can be used to assemble the different topologies as described herein. From an adversary's perspective, a change in topology can disrupt localized attacks launched, for example, by a compromised node in the network. Furthermore, it can advantageously disrupt localized jamming attacks, and coordinated eavesdropping monitoring a particular command and control structure operating in the topology.

Exemplary Defensive Coordination Scenarios

From the foregoing discussion it will be understood that the inventive arrangements described herein utilize a unique cross-layer correlation between platform-specific events and protocol-related effects to provide a robust, secure infrastructure. A conventional security environment reacts to effects noticed at the higher layers of the communications protocol stack. For example, if a communications node begins to misroute packets, or drop routes/change routes to favor a previously seldom used routing node, this might be a concern to the security software that detects these anomalies. The security software recognizes that these actions represent a waste of transmission capacity, and may flag the effect as a distributed denial of service attack. However, the result is that one or more nodes have been compromised, the damage has been done, and isolation of the offending node(s) takes a relatively long time. More sophisticated security analysis tools might then later determine that the event that caused these effects was a code injection attack on a vulnerable node.

One response to this situation would be to turn on evasive actions, such as IP-address hopping. However, such obfuscatory responses are almost always applied to all nodes in a security management realm and without regard to time or event analysis. Thus the entire system pays an overhead price in employing evasive maneuvers, even though the majority of the communications nodes remain attack-free. In contrast, the solution described herein utilizes notice of events to selectively trigger responses across layers and across nodes.

Figure 15:
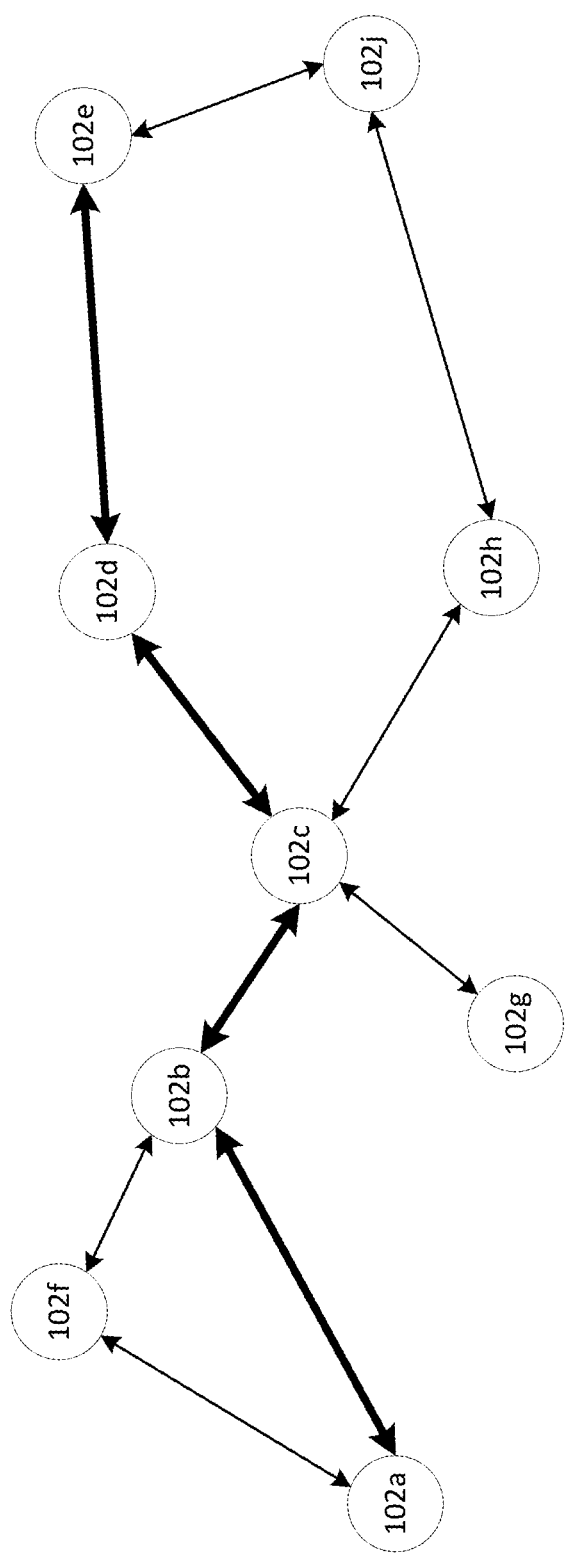
FIG. 15 is a diagram useful for understanding a plurality of nodes in a network, some part of a path critical to mission success, other not.

In FIG. 15 there is shown an example of how a SCNM as described herein creates a novel capability to thwart attacks. Consider a set of nodes ($102a$-$102j$) in which $102c$ is a mission critical node. Node $102a$ needs to communicate with $102c$ for mission success as does node $102e$. Nodes $102b$ and $102d$ are along the critical path. Nodes $102f$, $102g$, $102h$ and $102j$ are all in the mesh communications network, but are not currently along a critical path. Assume that the secure core 300 in a node $102a$ or $102e$ traps a code injection attempt and notifies the distributed SCNM infrastructure. The SCNM infrastructure has knowledge that node $102c$ is a critical node and that links from its managed source nodes $102b$ and $102e$ are critical. Based on a network optimization analysis performed in accordance with FIGS. 9-11, the SCNM determines that nodes $102b$, $102c$ and $102d$ should increase their sensitivity to perceived network threats. In other words, under normal conditions when there is no perceived threat, the routing operation might continue with a higher threshold for accepting the occurrence eof dropped or rerouted packets. But the event or events at a lower layer at a distant node (e.g., node $102a$ or $102e$) can trigger a response across the network of distributed entities to be on high alert and tighten up the tolerance for any effects potentially due to malicious attacks. Nodes $102f$ and $102j$, being adjacent to nodes where physical layer platform traps have occurred are directed by the SCNM to a medium level of effect tolerance. Nodes $102g$ and $102h$ are unaffected by the alerts. They are currently not part of a potential threat path and do not need to throttle thresholds at this time. From the foregoing it will be understood that the inventive arrangements allow for a modulated response to attacks, maintaining the most connectivity and traffic capacity possible among nodes unaffected by the current perceived threat situation.

Up to this point in the foregoing example, we considered the cross-layer correlation between events and effects from the bottom up. That is, from the underlying events up to the perceived effects of such events upon the network. However, the invention also utilizes the reverse direction as an additional security mechanism. There is value in the upper layer modeling of the effects environment. And recognition of changes in the effects environment may detect an attack event that has not been explicitly built into the event horizon of the secure core. For example, a deployed tactical or emergency services network operates in a manner that can be seen as a pattern of operation. Mobile nodes go in and out of canopy, may be blocked by buildings and may lose line-of-sight peer connectivity due to terrain. All of these physical activities create a pattern of packet retransmissions and routing state updates. A model of these effects is maintained at the network layer. During operations, even application layer changes (such as when video is prioritized over voice due to current operations) affect the network traffic model the node creates and these affects are maintained in memory as "correct".

If the nodes are steady and the model behavior changes detrimentally, the node may have an indication of an attack vector not trapped by the secure core 300. If the nodes are in motion but the model does not follow the learned pattern, this also might indicate an unknown type of attack. The upper layer distributed components of the SCNM can alert the secure core 300 in a node of a possible attack. In this case, the system might conclude that a new low-level exploit has compromised one or more nodes. While this is not part of the existing event trap list used in the NLEDM 512 of the secure core, the nodes can be isolated and the exploit noted for future core updates.

From the foregoing it will be understood that the inventive arrangements involve use of a dual process machine learning (cognition) approach to take advantage of the cross-layer activity. First, it models the system operation to fit the observations of events and effects. So when certain attack types cause effects across the range of the communications protocol stack, the model correlates these. Second, the model anticipates the next state of the system. In critical path traffic scenarios, a certain level of retransmission is statistically expected. Should this level change, the next state of the system will not be what is expected. Thus, the model allows the conditions noted at higher layers of the protocol stack to be noted by the distributed components of a distributed processor, and to be fed back down to the secure core in each node. The individual secure processes at each node 102 notice of potential problems due to upper layer pattern recognition.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout the specification may, but do not necessarily, refer to the same embodiment.

Figure 16:
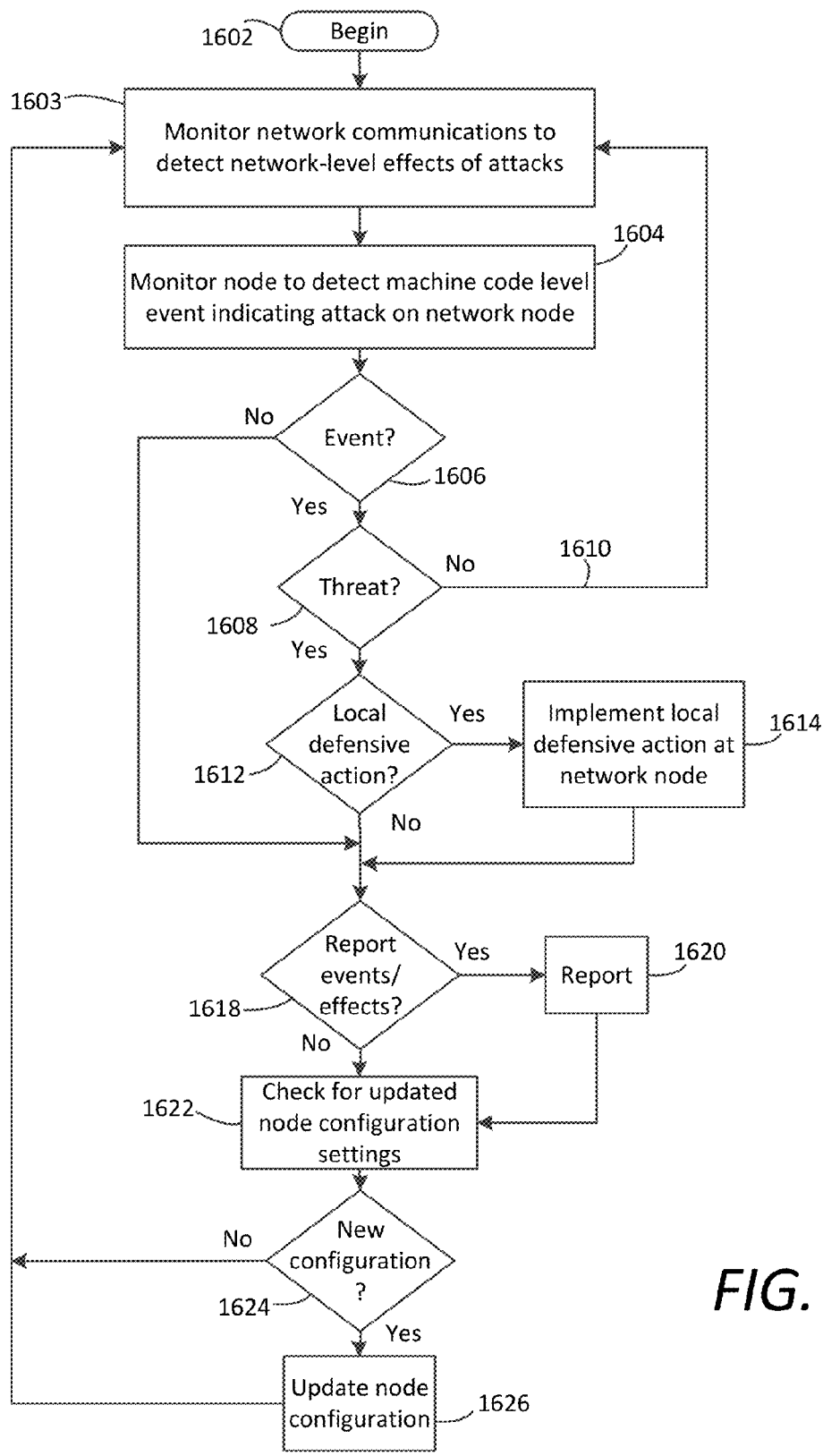
FIG. 16 is a flowchart that is useful for understanding actions performed by a network node.

Referring now to FIG. 16 there is shown a flowchart which is useful for understanding certain actions performed in secure core 300. The process begins at 1602 and continues to 1603 where the node performs actions to detect network-level effects of attacks noticed at higher layers of the communication stack. These actions can be performed at node 102 by processor 306. Such detected effects can include instances where a communications node begins to misroute packets, drop routes/change routes to favor a previously seldom used routing node. Effects such as these can indicate the presence of an ongoing attack upon the network, e.g., a jamming attack. The secure core can recognize that such actions are seriously wasting transmission capacity, and flag the effect as a distributed denial of service attack.

At 1604 the secure core perform actions to detect machine or instruction level events indicating the possible occurrence of a node-level attack intended to disrupt internal operations or functions of a node. These actions can be performed using NLEDM 512. Although steps 1603 and 1604 are shown as being performed serially, it should be understood that the detection of machine or instruction level events can be performed concurrently with monitoring of the network communications to detect network-level effects of attacks.

At 1606 a determination is made as to whether an event has been detected at the machine or instruction code level which indicates a node-level attack. If so, the process continues on to 1608; otherwise the process continues to 1618. At 1608 a determination is made as to whether the event or events that have occurred are of a nature or frequency such that some action is required by the node 102. If not (1608: No) then the process returns to 1603 so that monitoring of network communications and node events can continue.

If the event or events are of a kind or frequency such that the node 102 determines that the attack is a potential threat or security risk (1608: Yes), the process continues on to step 1612 where a determination is made as to whether the event or events requires a local defensive action at the node. If so (1612: Yes) the secure core at node 102 will at 1614 implement certain defensive actions at the node. The decision to implement these local defensive actions at the node may or may not require the involvement of the distributed SCNM infrastructure.

At step 1618, a determination is made as to whether any detected network-level effects and/or node-level events should be reported to the distributed SCNM infrastructure. If yes (1618: Yes) then control channel communications are used by secure core 300 to communicate or report such occurrence. The process then continues on to 1622 where the secure core of the node will check to determine whether the distributed SCNM infrastructure has updated the node configuration settings. Such updated node configuration settings can be determined by the SCNM infrastructure in accordance with a process as described herein in relation to FIGS. 7-11. If a determination is made at 1624 that updated node configuration settings have been specified (1624: Yes) then the node configuration is updated at 1626. Thereafter, the process returns to 1603 to continue monitoring operations.

It should be noted that different nodes within the network may be updated to have different node configuration settings (including different defensive settings). These different configurations can be selected and/or optimized for each node 102 by the distributed SCNM infrastructure in accordance with the mission requirements of the network 104.

The updated node configuration settings can cause the node to implement certain high-level defensive actions. These defensive actions can include implementation of any defensive high-level network algorithms such as described herein. These high-level defensive actions can involve the entire communication network or a plurality of nodes comprising only a portion of the network. For example, selected nodes in the network can be reconfigured to implement (1) multi-layer address hopping (2) network and link interface migration, and/or (3) dynamic topology management algorithms to defend against high-level network attacks. Other high-level defensive algorithms are possible without limitation.

The updated node configuration can also cause the node to implement low-level (node-level) defensive actions. Such low-level defensive actions can involve (1) varying the number and/or types of machine level events which are detected (2) modifying a threat evaluation threshold level applied at 1608 when determining whether a particular event is a threat, (3) modifying the number and/or types of local defensive actions which are implemented at 1612 in response to events that are deemed threats, and/or (4) varying an evaluation process applied at 1618 for purposes of determining when events/effects should be reported to the distributed SCNM infrastructure.

According to one aspect of the invention, the node-level events which are detected and acted upon by the network as described herein are advantageously selected to include instruction-set level events exclusive of events which are associated with the network communication domain. In other words, the adaptive network described herein is responsive to node-level events, including events occurring at the instruction level, which are outside the normal domain of network communications. These events are advantageously used as indicators and/or trigger by the SCNM distributed infrastructure, even though they do not correspond to functions or processes normally associated with network communications.

As used herein, the network communication domain generally includes all aspects of the communication between two systems; that is, the network communication domain includes not only the actual network communication stack and associated network hardware, but also the machine code elements that execute in response to handling events within the communication domain. Node-level attacks directed to functions and processes which are associated with the network communication domain will naturally be used to inform the SCNM distributed infrastructure for purposes of triggering and shaping adaptive responses described herein. However, the inventive arrangements herein go further insofar that events which trigger and shape adaptive network responses at the macro or network level can include events which have no relation to the network communication domain.

Instruction level events outside the realm or domain of network communications can provide early and effective indications of network related threats. Examples of instruction level events could be but are not limited to function calls to anomalous locations, access to invalid memory, or attempts to execute data. While these events can (and do) occur within the communication domain, we can also observe these events in machine-level instructions that are not directly related to the communication domain and do not involve processing of network data. For example, when packets arrive at a network interface there is machine code associated with handling these packages and processing their content. In this invention, events as described above can occur outside of this machine code associated with the network communication domain, and yet can still drive changes in the network domain.

The described features, advantages and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

All of the apparatus, methods and algorithms disclosed and claimed herein can be made and executed without undue experimentation in light of the present disclosure. While the invention has been described in terms of preferred embodiments, it will be apparent to those of skill in the art that variations may be applied to the apparatus, methods and sequence of steps of the method without departing from the concept, spirit and scope of the invention. More specifically, it will be apparent that certain components may be added to, combined with, or substituted for the components described herein while the same or similar results would be achieved. All such similar substitutes and modifications apparent to those skilled in the art are deemed to be within the spirit, scope and concept of the invention as defined.

We claim:

1. A method for defending a communication network from an adversarial attack using a distributed infrastructure that leverages coordination across disparate abstraction levels, comprising:
   at each node computing device of a plurality of node computing devices comprising a communication network, using a stored event list to detect at least one node event occurring at a machine code level which is known to have the potential to interfere directly with the internal operation of the node computing device;
   responsive to detecting the at least one node event at a first node computing device of the plurality of node computing devices,
      automatically selectively determining an optimal network-level defensive action involving a plurality of network nodes comprising the communication network, the network-level defensive action based on the at least one node event which was detected and upon a set of known communication requirements established for said communication network; and
      causing an increase in at least one second node computing device's sensitivity to unexpected variations in network performance, the at least one second node computing device being (a) different from the first node computing device and (b) part of a potential threat path within the communication network; and
   wherein the at least one node event comprises an instruction-set level event exclusive of an event within a network communication domain.

2. The method according to claim 1, wherein the network communication domain includes the network communication stack, hardware elements that are exclusively associated with the network communication stack, and a plurality of machine code elements that handle events exclusively pertaining to the communication stack.

3. The method according to claim 1, further comprising automatically selectively implementing a node-level defensive action which affects only the node where the at least one node event has been detected if the at least one node event does not require a network-level defensive action to ensure continued satisfaction of the known communication requirements.

4. The method according to claim 1, further comprising:
   maintaining at the plurality of node computing devices a dynamic model which is representative of a pattern of network operation for said communication network;
   using said dynamic model to compare actual network-level events to a range of expected network-level events; and selectively modifying a node-level defensive action which is performed in response to said at least one node event when said actual network-level events do not correspond to a range of expected network-level events.

5. The method according to claim 4, further comprising selectively reducing said range of expected network-level events in response to the node event which has been detected, whereby the network is made more sensitive to unexpected variations in network performance when said at least one node event is detected.

6. The method according to claim 1, wherein the network-level defensive action is selected from the group consisting of network address hopping, multi-link coordination to contextually utilize redundant communication links between node computing devices, and real-time dynamic network topology management.

7. The method according to claim 1, wherein processing activities at the node computing device are performed exclusively using a computer hardware implementation that is resistant to a code injection attack.

8. The method according to claim 7, wherein the computer hardware implementation is comprised of non-real-time alterable circuit logic device capable of being created with or loaded with logical sequences of operation.

9. The method according to claim 1, wherein the at least one node event occurring at a machine code level comprises is an event that is indicative of a code injection attack.

10. The method according to claim 1, wherein the network-level defensive action comprises a modification of communication protocols used for communicating among node computing devices at a network level.

11. The method according to claim 1, responsive to detecting the at least one node event at the node computing device, automatically selectively modifying a predetermined defensive response of one or more of the node computing devices to subsequently detected node events.

12. A communication network which defends itself from adversarial attack using a distributed infrastructure that leverages coordination across disparate abstraction levels, comprising:
a plurality of node computing devices comprising a communication network, each said node computing device using a stored event list to detect at least one node event occurring at a machine code level which is known to have the potential to interfere directly with the internal operation of the node computing device;
at least one processing device which is responsive to detecting the at least one node event at a first node computing device of the plurality of node computing devices, and which
automatically selectively determines an optimal network-level defensive action involving a plurality of network nodes comprising the communication network, the network-level defensive action based on the at least one node event which was detected and upon a set of known communication requirements established for said communication network, and
causes an increase in at least one second node computing device's sensitivity to unexpected variations in network performance, the at least one second node computing device being (a) different from the first node computing device and (b) part of a potential threat path within the communication network; and
wherein the at least one node event comprises an instruction-set level event exclusive of an event within a network communication domain.

13. The communication network according to claim 12, wherein the at least one processing device automatically selectively implements a node-level defensive action which affects only the node where the at least one node event has been detected if the at least one node event does not require a network-level defensive action to ensure continued satisfaction of the known communication requirements.

14. The communication network according to claim 12, wherein the at least one processing device
maintains at the plurality of node computing devices a dynamic model which is representative of a pattern of network operation for said communication network;
uses said dynamic model to compare actual network-level events to a range of expected network-level events; and
selectively modifies a node-level defensive action which is performed in response to said at least one node event when said actual network-level events do not correspond to a range of expected network-level events.

15. The communication network according to claim 14, wherein the at least one processing device selectively reduces said range of expected network-level events in response to the node event which has been detected, whereby the network is made more sensitive to unexpected variations in network performance when said at least one node event is detected.

16. The communication network according to claim 12, wherein the network-level defensive action is selected from the group consisting of network address hopping, multi-link coordination to contextually utilize redundant communication links between node computing devices, and real-time dynamic network topology management.

17. The communication network according to claim 12, wherein processing activities at the node computing device are performed exclusively using a computer hardware implementation that is resistant to a code injection attack.

18. The communication network according to claim 17, wherein the computer hardware implementation is comprised of non-real-time alterable circuit logic device capable of being created with or loaded with logical sequences of operation.

19. The communication network according to claim 12, wherein the at least one node event is an event that is indicative of a code injection attack.

20. The communication network according to claim 12, wherein the network-level defensive action comprises a modification of communication protocols used for communicating among node computing devices at a network level.

21. The communication network according to claim 12, wherein the at least one processing device is responsive to detecting the at least one node event at the node computing device to automatically selectively modify a predetermined defensive response of one or more of the node computing devices to subsequently detected node events.

* * * * *